United States Patent
Namikata

(10) Patent No.: US 8,441,690 B2
(45) Date of Patent: May 14, 2013

(54) IMAGE PROCESSING APPARATUS AND IMAGE PROCESSING METHOD FOR PROCESSING SCREEN-PROCESSED IMAGE

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 12/604,121

(22) Filed: Oct. 22, 2009

(65) Prior Publication Data

US 2010/0103468 A1    Apr. 29, 2010

(30) Foreign Application Priority Data

Oct. 29, 2008    (JP) ................................. 2008-278651

(51) Int. Cl.
  *H04N 1/405*    (2006.01)
(52) U.S. Cl.
  USPC .......................... 358/3.24; 358/3.14; 358/3.28
(58) Field of Classification Search .................... 358/1.9, 358/2.1, 1.12, 3.01, 3.14, 3.16–3.18, 3.2, 358/3.24, 1.18, 3.12, 528, 451, 3.28
  See application file for complete search history.

(56) References Cited

U.S. PATENT DOCUMENTS

| 4,827,352 A | 5/1989 | Yoneda et al. |
| 4,897,736 A * | 1/1990 | Sugino ............................ 358/1.9 |
| 4,910,603 A * | 3/1990 | Hirahara et al. .............. 358/3.14 |
| 4,975,860 A * | 12/1990 | Kitaya et al. .................... 358/1.9 |
| 6,608,702 B1 * | 8/2003 | Urasawa ......................... 358/3.2 |
| 8,243,332 B2 * | 8/2012 | Yoshida .......................... 358/1.9 |
| 2010/0103435 A1 | 4/2010 | Namikata |

FOREIGN PATENT DOCUMENTS

| JP | 62-216476 A | 9/1987 |
| JP | 2007-196567 A | 8/2007 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

A multi-value code image generation part generates a multi-value code image by assigning first code information, which is obtained by encoding a dot pattern in a specific area, to each growth core. A multi-value code image affine transformation part performs affine transformation on the multi-value code image. A multi-value code image assignment part assigns second code information to each of the growth cores before the affine transformation according to the first code information of at least one growth core after the affine transformation, which growth core neighbors close to the growth core before the affine transformation. A dot pattern development part develops the dot pattern for the specific area at each of the growth cores before the affine transformation according to the second code information.

17 Claims, 32 Drawing Sheets

FIG.13

ORIGINAL IMAGE   90 DEGREE COUNTER-CLOCKWISE ROTATION

IMAGE PROCESSING APPARATUS AND IMAGE PROCESSING METHOD FOR PROCESSING SCREEN-PROCESSED IMAGE

BACKGROUND OF THE INVENTION

1. Field of the Invention

The present invention relates to an image processing apparatus and an image processing method for processing a screen-processed image.

2. Description of the Related Art

An electrophotographic system is known as an image recording system used for an image formation apparatus such as a printer and a copy machine. The electrophotographic system forms a latent image on a photosensitive drum utilizing a laser beam and develops the image using charged color material (hereinafter, called toner). Recording of an image is carried out by transferring and fixing the image formed by the developed toner onto a transfer sheet.

While the output image at that time is considered to be multi-gradation image data including a halftone, it is difficult to obtain the halftone image with the above electrophotographic system. Accordingly, image formation is typically carried out by generation of pseudo-halftone image data composed of a dot pattern of N bits (N=1, 2, 4, etc.) using screen processing.

Meanwhile, the image is sometimes stored temporarily in a storage unit such as a memory or a hard disk drive within a printer or a copy machine for the purpose of finishing processing such as book binding and page imposition, or for the purpose of error processing such as sheet size change when the sheet has run out. In carrying out such finishing processing or error processing, it is frequently required to rotate and/or change magnification (size change) of the accumulated image.

When the image data is accumulated or stored, it is advantageous in terms of capacity to store the image data composed of the dot pattern of N bits after the screen processing compared to the multi-gradation image data. However, it is difficult to appropriately perform image rotation and/or magnification change, which are/is necessary when the above finishing processing or error processing is performed, on an image after the screen processing.

FIG. 30 shows a state of rotating a screen-processed original image counter-clockwise by 90 degrees. In the image rotated counter-clockwise, it is apparent that the dot pattern shape formed by the screen processing has been changed. This becomes a factor changing a latent image pattern obtained by the laser irradiation on the photosensitive drum, and thereby causes a problem that output image density changes between the case with 90 degree rotation and the case without rotation. Further, if a growth pattern is configured for reducing mechanical jitters and irregularity in a printer engine, the reduction effect is lost and image degradation is caused such as appearance of moire or irregularity.

FIGS. 31 and 32 show states of twofold enlargement and half reduction for screen-processed original image, respectively. Apparently in these cases, there arises a problem that an original screen pattern is lost and the image is deteriorated.

For solving the problem for the rotation, Japanese Patent Laid-Open No. 2007-196567 discloses a technique carrying out the following processing when the rotation processing is necessary for an image. That is, the screen processing is carried out by using a dither matrix which is generated by rotation of a dither matrix itself to be used for the screen processing in a reverse angle of the image rotation angle, and then the screen-processed image is rotated. This provides an image equivalent to an image subjected to the screen processing after the image rotation in the multi-gradation image.

In addition, for solving the problem for the magnification change, Japanese Patent Laid-Open No. S62-216476 (1987) discloses a technique carrying out the following processing. That is, a screen-processed image is subjected to the magnification change, a multi-gradation image is obtained by calculation of an average density in an image after the magnification change, and the screen processing is performed again on the obtained multi-gradation image using the dither matrix.

However, there is a problem that even the technique disclosed by above Japanese Patent Laid-Open No. 2007-196567 can cope with only the case that an image is preliminarily rotated and the rotation angle is known.

Further, there is a problem that even the technique disclosed by Japanese Patent Laid-Open No. S62-216476 (1987) does not restore the multi-gradation image, obtained by the density averaging of the image which has been obtained by the magnification change of the screen-processed image, completely to the image obtained by the magnification change of the original multi-gradation image. Accordingly, there is a problem that the result of the screen processing for the multi-gradation image obtained by the density averaging is different from that of the screen processing for the image obtained by the magnification change of the multi-gradation image.

SUMMARY OF THE INVENTION

The present invention provides an image processing apparatus and an image processing method which are capable of obtaining an image equivalent to an image obtained by screen processing of a multi-gradation image after rotation processing and/or magnification change processing, even when the screen-processed image is subjected to at least one of the rotation processing and the magnification change processing.

An image processing apparatus of the present invention includes: a unit generating a multi-value code image by assigning first dot pattern code information to each of growth center pixels which are growth centers of screen processing, in an image subjected to the screen processing by use of a dither matrix, the first dot pattern code information representing a dot pattern and obtained by encoding the dot pattern existing in an image area where dots grow around the growth center pixel; a unit performing an affine transformation on the multi-value code image; a unit assigning second dot pattern code information which represents the dot pattern, to each of the growth center pixels before the affine transformation in the multi-value code image after the affine transformation according to the first dot pattern code information of at least one growth center pixel after the affine transformation, the at least one growth center pixel neighboring close to the growth center pixel before the affine transformation; and a unit developing the dot pattern for the image area at each of the growth center pixels before the affine transformation according to the second dot pattern code information.

An image processing method of the present invention includes the steps of: generating a multi-value code image by assigning first dot pattern code information to each of growth center pixels which are growth centers of screen processing, in an image subjected to the screen processing by use of a dither matrix, the first dot pattern code information representing a dot pattern and obtained by encoding the dot pattern existing in an image area where dots grow around the growth center pixel; performing an affine transformation on the multi-value code image; assigning second dot pattern code information which represents the dot pattern, to each of the growth center pixels before the affine transformation in the multi-value code image after the affine transformation according to the first dot pattern code information of at least one growth center pixel after the affine transformation, the at least one growth center pixel neighboring close to the growth center pixel before the affine transformation; and developing the dot pattern for the image area at each of the growth center pixels before the affine transformation according to the second dot pattern code information.

A computer-readable recording medium of the present invention records a program for causing a computer to execute the above method.

A program of the present invention causes a computer to execute the above method.

According to the present invention, when the rotation and/or magnification change are/is performed on an image subjected to screen processing, it is possible to obtain a screen image having the same line number, angle, and growth pattern as those of a screen-processed image of a multi-value code image after the rotation and/or magnification change processing.

Further features of the present invention will become apparent from the following description of exemplary embodiments (with reference to the attached drawings).

BRIEF DESCRIPTION OF THE DRAWINGS

FIG. 13 is a diagram showing a numerical value example of a dither matrix according to an embodiment of the present invention;

DESCRIPTION OF THE EMBODIMENTS

Figure 1:
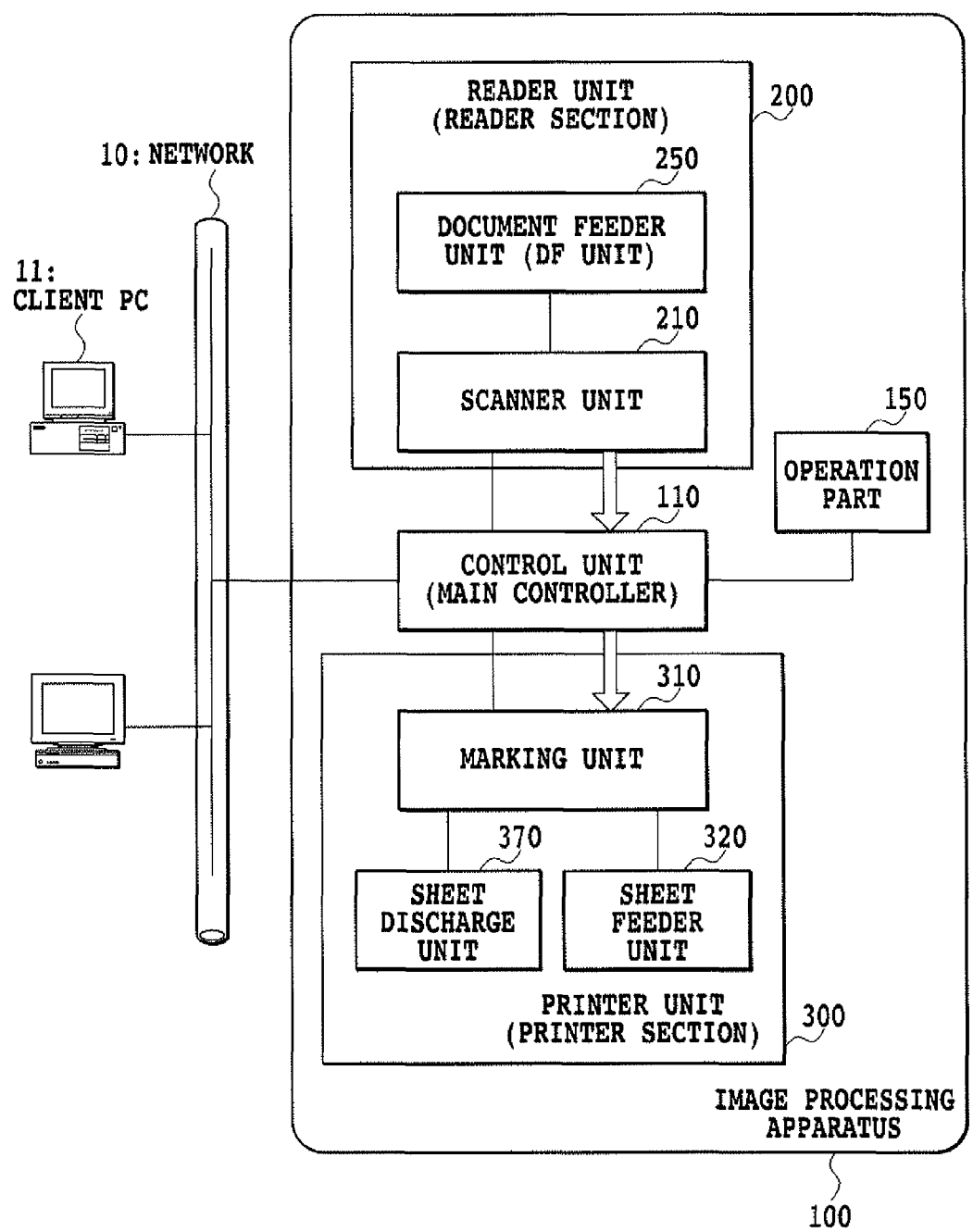
FIG. 1 is a schematic entire block diagram of an image processing apparatus according to an embodiment of the present invention.

Hereinafter, embodiments of the present invention will be described in detail with reference to the drawings. Note that constituents having the same function are denoted by the same symbol in the drawings to be described below and repeated description thereof will be omitted.

First Embodiment

Entire Configuration of an Image Processing Apparatus

An entire configuration of an image processing apparatus according to an embodiment of the present invention will be described with reference to FIG. 1.

FIG. 1 is a block diagram showing the configuration of an image processing apparatus 100 according to the present embodiment. In FIG. 1, a reader section (image input unit) 200 reads a document image optically and converts the document image into image data. The reader section 200 includes a scanner unit 210 having a function of reading a document and a document feeder unit 250 having a function of feeding a document sheet.

A printer section (image output unit) 300 feeds a recording sheet, prints the image data as a visible image thereon, and discharges the sheet to the outside of the apparatus. The printer section 300 includes a sheet feeder unit 320 having plural kinds of recording sheet cassettes and a marking unit 310 having a function of transferring and fixing the image data onto the recording sheet. Further, the printer section 300 includes a sheet discharge unit 370 having a function of outputting the printed recording sheet outside of the apparatus after sorting and stapling.

A control unit 110 is electrically connected to the reader section 200 and the printer section 300 and further connected to a client PC 11 via a network 10 such as Ethernet (registered trade mark).

The control unit 110 reads the image data of the document by controlling the reader section 200, and provides a copy function of outputting the image data onto the recording sheet by controlling the printer section 300. In addition, the control unit 110 provides also a printer function. In this printer function, the image processing apparatus 100 receives PDL (Page Description Language) data converted by a printer driver from an application operating on the client PC 11, via the network 10. Then, the image processing apparatus 100 converts the PDL data into image data by PDL processing operating on a CPU in the control unit 110 and outputs the image data to the printer section 300.

An operation part 150 is connected to the control unit 110 and includes a liquid crystal touch panel, and provides a user I/F for operating the image processing apparatus 100. That is, a user can input a predetermined instruction into the image processing apparatus 100 via the operation part 150. In addition, a display part (not shown) can display predetermined information such as a state of the apparatus on the above liquid crystal touch panel.

Figure 2:
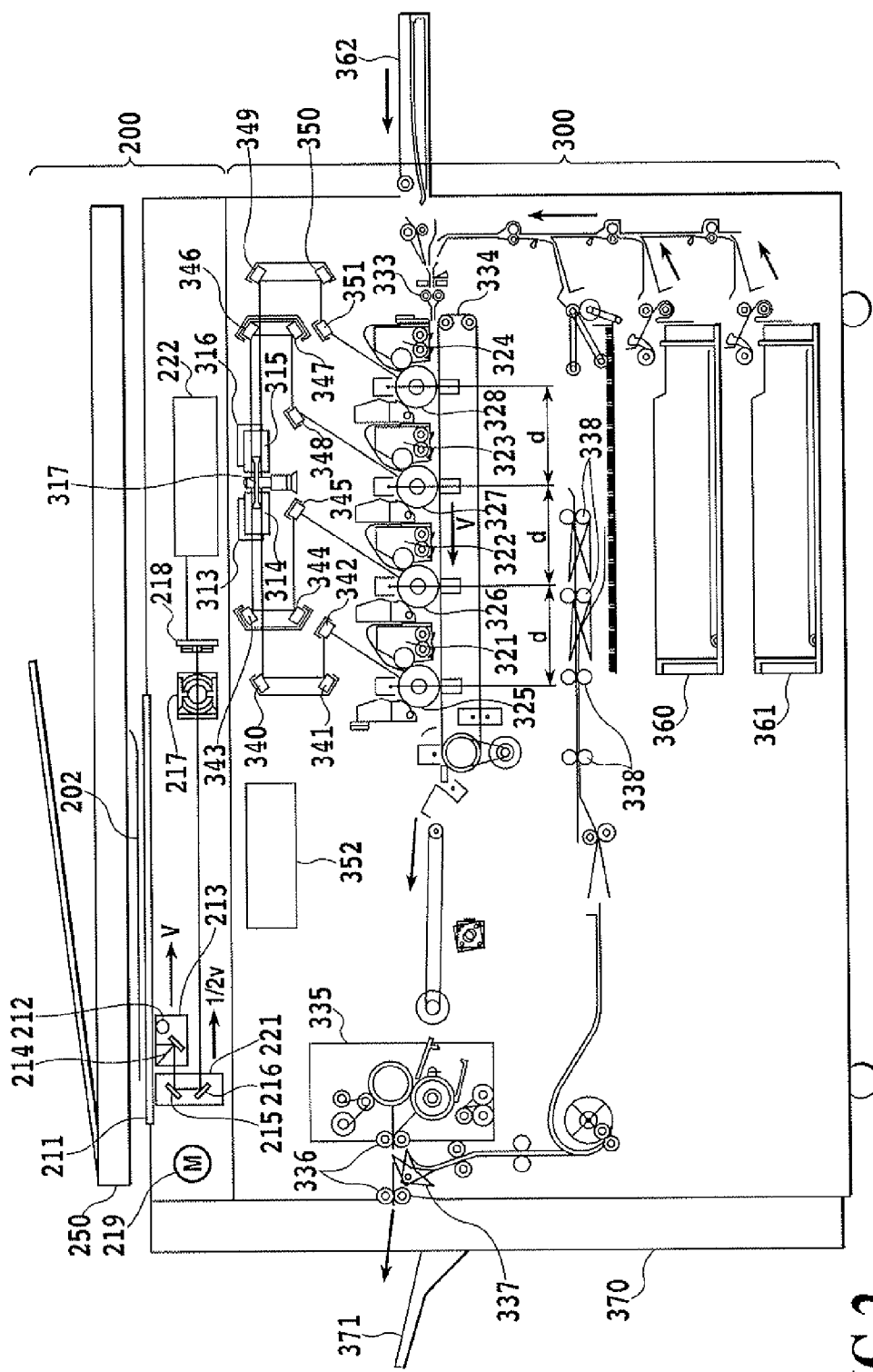
FIG. 2 is a cross-sectional view of a reader section and a printer section of an image processing apparatus according to an embodiment of the present invention.

Next, operation in each part of the reader section 200 and the printer section 300 shown in FIG. 1 will be described by use of the cross-sectional view of FIG. 2.

In the reader section 200, the document feeder unit 250 feeds a document onto a platen glass 211 sheet by sheet in the order from the front page and discharges the document on the platen glass 211 after the document read operation. The reader section 200 lights a lamp 212 when the document is fed onto the platen glass 211 and causes an optical unit 213 to start moving and to expose and scan the document. The reflected light from the document at this time is guided to a CCD image sensor (hereinafter, called CCD) 218 by mirrors 214, 215 and 216 and a lens 217. In this manner, the scanned image of the document is read by the CCD 218.

Figure 3:
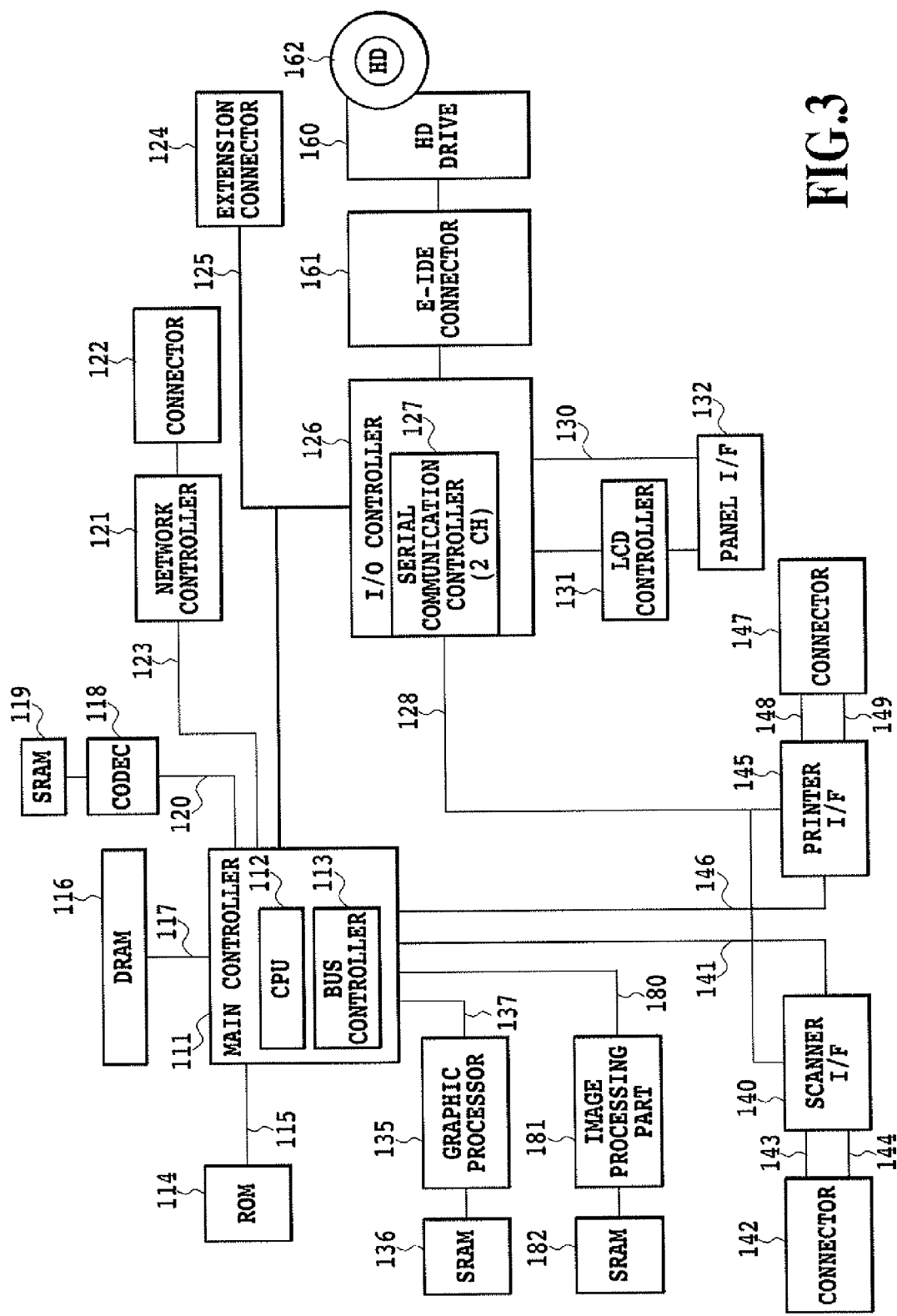
FIG. 3 is a block diagram of a control unit in an image processing apparatus according to an embodiment of the present invention.

A reader image processing circuit part 222 performs a predetermined processing on image data output from the CCD 218 and outputs the image data to a control unit 110 via a scanner I/F 140 (refer to FIG. 3). A printer image processing circuit part 352 converts an image signal sent from the control unit 110 via a printer I/F 145 (refer to FIG. 3) into a signal driving a laser driver and then outputs the converted signal to the laser driver.

In the printer section 300, the laser driver 317 drives laser emission parts 313, 314, 315 and 316, and enables the laser emission parts 313, 314, 315 and 316 to emit laser beams according to the image data output from the printer image processing circuit part 352. These laser beams are irradiated onto photosensitive drums 325 to 328 by mirrors 340 to 351 and latent images are formed according to the laser beams on the photosensitive drums 325 to 328 charged by operation of charging parts which are not shown in the drawing, respectively.

Symbols 321, 322, 323 and 324 indicate development devices for developing the latent images with toners of black (Bk), yellow (Y), cyan (C), and magenta (M), respectively, and respective colors of the developed toners are transferred onto a sheet for a print out in full color.

A sheet fed from any one of sheet cassettes 360 and 361 and a manual tray 362 at timing synchronized with the start of the laser beam irradiation is sucked onto a transfer belt 334 via a resist roller 333 to be conveyed. Then, the developers attached to the photosensitive drums 325, 326, 327 and 328 are transferred onto the recording sheet.

The recording sheet carrying the developers are conveyed to a fixing part 335 and the developers are fixed onto the recording sheet by heat and pressure of the fixing part 335. The recording sheet passing through the fixing part 335 is discharged by a discharge roller 336, and a discharge unit 370 sorts the recording sheets by putting together the discharged recording sheets and staples the sorted recording sheets.

When book binding recording is set, the recording sheet having been conveyed to the discharge roller 336 is guided to a re-feeding conveyance route 338 by a flapper 337 after the reversal of the rotation direction in the discharge roller 336. The recording sheet having been guided to the re-feeding conveyance route 338 is fed to the transfer belt 334 at the above described timing.

<Explanation of the Control Unit>

The configuration of the control unit 110 shown in FIG. 1 will be described by use of the block diagram shown in FIG. 3.

In FIG. 3, a main controller 111 mainly includes a CPU 112, a bus controller 113, and various kinds of I/F controller circuits.

The CPU 112 and the bus controller 113 control the operation of the entire control unit 110, and the CPU 112 is operated according to a program read from a ROM 114 via a ROM I/F 115.

Operation of interpreting the PDL (Page Description Language) code data received from the client PC 11 and developing the PDL code data into image data is also described in this program and processed by the software. The bus controller 113 controls data transfer into and from each I/F and controls arbitration of bus competition and DMA data transfer.

A DRAM 116 is connected to the main controller 111 by a DRAM I/F 117 and used as a work area for the operation of the CPU 112 and an area for accumulating image data.

A codec 118 compresses the image data accumulated in the DRAM 116 into code data of a format such as MH, MR, MMR, JBIG, and JPEG and conversely decompresses the compressed accumulated code data into the image data. An SRAM 119 is used as a temporary work area for the codec 118. The codec 118 is connected to the main controller 111 via an I/F 120, and the data transfer with the DRAM 116 is controlled by the bus controller 113 to be transferred in the DMA mode.

An image processing part 181 carries out processing converting the image data generated in the reader section 200 by the document reading or the image data generated by the PDL processing operating on the main controller 111 into the image data suitable for printing in the printer section 300. An SRAM 182 is used as a temporary work area for the image processing part and as a storage area of setting information. The image processing part 181 is connected to the main controller 111 via a bus I/F 180, and the data transfer with the DRAM 116 is controlled by the bus controller 113 to be transferred in the DMA mode.

A graphic processor 135 performs image processing such as affine transformation (image rotation and/or image magnification change) and image synthesis on the image data accumulated in the DRAM 116. An SRAM 136 is used as a temporary work area for the graphic processor 135 and as a storage area of the setting information. The graphic processor 135 is connected to the main controller 111 via an I/F 137, and the data transfer with the DRAM 116 is controlled by the bus controller 113 to be transferred in the DMA mode.

Note that the configurations and functions of the image processing part 181 and the graphic processor 135 will be described hereinafter in detail.

A network controller 121 is connected to the main controller 111 by an I/F 123 and connected to an external network by a connector 122. Typically, the network includes Ethernet (registered trade mark).

A universal high-speed bus 125 is connected with an extension connector 124 and an I/O controller 126 for the connection of an extension board.

The I/O controller 126 includes two channels of a asynchronous serial communication controller 127 for transmitting and receiving a control command to and from each of CPUs in the reader section 200 and the printer section 300 and is connected to the external I/F circuits 140 and 145 by an I/O bus 128.

A panel I/F 132 is connected to an LCD controller 131 and includes an I/F for displaying an image on a liquid crystal screen of the operation section 150 and a key input I/F 130 for carrying out the input of a hard key or a touch panel key. The operation part 150 includes a liquid crystal display part, a touch panel input device attached on the liquid crystal display part, and a plurality of hard keys. A signal input from the touch panel or the hard key is transferred to the CPU 112 via the above panel I/F 132, and the liquid crystal display part displays image data sent from the panel I/F 132. The liquid crystal display part displays a function list for the operation of the image processing apparatus 100, image data, etc.

An E-IDE interface 161 is provided for connecting an external storage unit. In the present embodiment, through this I/F 161, a hard disk drive 160 is connected, image data is stored into a hard disk 162, and image data is read from the hard disc 162.

Symbols 142 and 147 indicate connectors which are connected to the reader section 200 and the printer section 300, respectively, and includes asynchronous serial T/Fs 143 and 148 and video I/Fs 144 and 149.

The scanner I/F 140 is connected to the reader section 200 via a connector 142 and also to the main controller 111 by a scanner bus 141, and has a function of performing a predetermined processing on an image received from the reader section 200. Further, the scanner I/F 140 also has a function of outputting a control signal generated from a video control signal sent from the reader section 200, to the scanner bus 141. The data transfer from the scanner bus 141 to the DRAM 116 is controlled by the bus controller 113.

A printer I/F 145 is connected to the printer section 300 via a connector 147 and also connected to the main controller 111 by a printer bus 146. This printer I/F 145 has a function of performing a predetermined processing on image data output from the main controller 111 and outputting the image data to the printer section 300. Further, the printer I/F 145 also has a function of outputting a control signal generated from a video control signal sent from the printer section 300, to the printer bus 146. The data transfer of raster image data developed on the DRAM 116 to the printer section is controlled by the bus controller 113, and the data is transferred in the DMA mode to the printer section 300 via the printer bus 146 and the video I/F 149.

<Configuration of the Image Processing Part>

Figure 4:
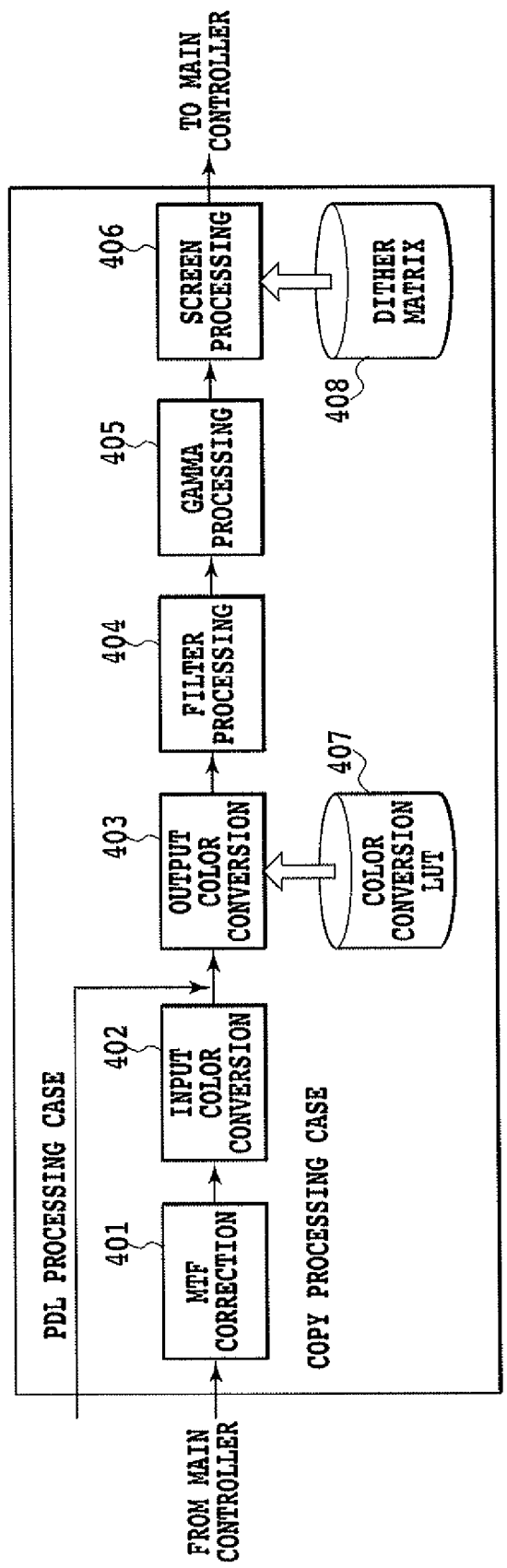
FIG. 4 is a block diagram of an image processing part in a control unit according to an embodiment of the present invention.

Next, the processing of the image processing part 181 provided in the control unit 110 will be described by use of the block diagram of FIG. 4.

The image processing part 181 includes a processing block specific to the operation of the copy function and a processing block common to the operations of the copy function and the PDL print function. The image processing part 181 processes image data sent from the main controller 111 via the bus I/F 180 and returns the processing result to the main controller 111 via the bus I/F 180 in the same way.

In the copy operation, MTF correction 401 corrects a read frequency characteristic of multi-value image data (here, 8 bits) read by the reader section 200. Input color conversion 402 carries out conversion from a color space specific to the reader section 200 to a common RGB color space, for the corrected image data. Here in the present embodiment, the color space conversion is assumed to carry out the conversion from the color space of the reader section to the colorimetric common RGB color space by matrix calculation using a preliminarily defined 3×3 matrix.

Output color conversion 403 carries out conversion from the common RGB color space into a printer color space which is suitable for a printer and composed of color components CMYK, by interpolation calculation using a color conversion LUT (Look Up Table) 407 for the image data subjected to the color space conversion to the common color space. The color conversion LUT here is a three dimensional LUT dividing each of the three components RGB with an appropriate grid spacing, and entries of respective LUTs have CMYK values with eight bit accuracy corresponding to the grid points of the LUTs, respectively. The image data is converted into the image data composed of the CMYK values by a known interpolation calculation by use of the three dimensional LOT.

Next, filter processing 404 performs filter processing of a product-sum operation on the CMYK image data using a filter coefficient according to a user setting. Thereby, it is possible to make CMYK image data for output to be sharp or flat.

The density characteristic of the image data processed as described above is corrected by gamma processing 405 including one dimensional. LUT. Here, both input and output of the LUT are assumed to have 8 bit accuracy. Finally, screen processing 406 converts the gamma-corrected image data into image data having pseudo-halftone expression of one bit for each color of CMYK using a dither matrix 408 and sends the processing result to the main controller. Here, the screen processing 406 carries out processing of comparing the input image data with numerical values on the dither matrix 408 stored in the SRAM 182 and outputting one if a numerical value of the input image data is larger and zero if the numerical value of the input image data is smaller. While the present embodiment carries out the screen processing of one bit output for simplicity of explanation, the output bit number is not limited to one bit.

Further, the screen processing 406 can use a plurality of dither matrices 408 switched by an instruction of the main controller 111. In this case, the main controller 111, after storing the dither matrix retained in the ROM 114 or the DRAM 116 into the SRAM 182, instructs the image processing part 181 to carry out the processing.

Figure 6:
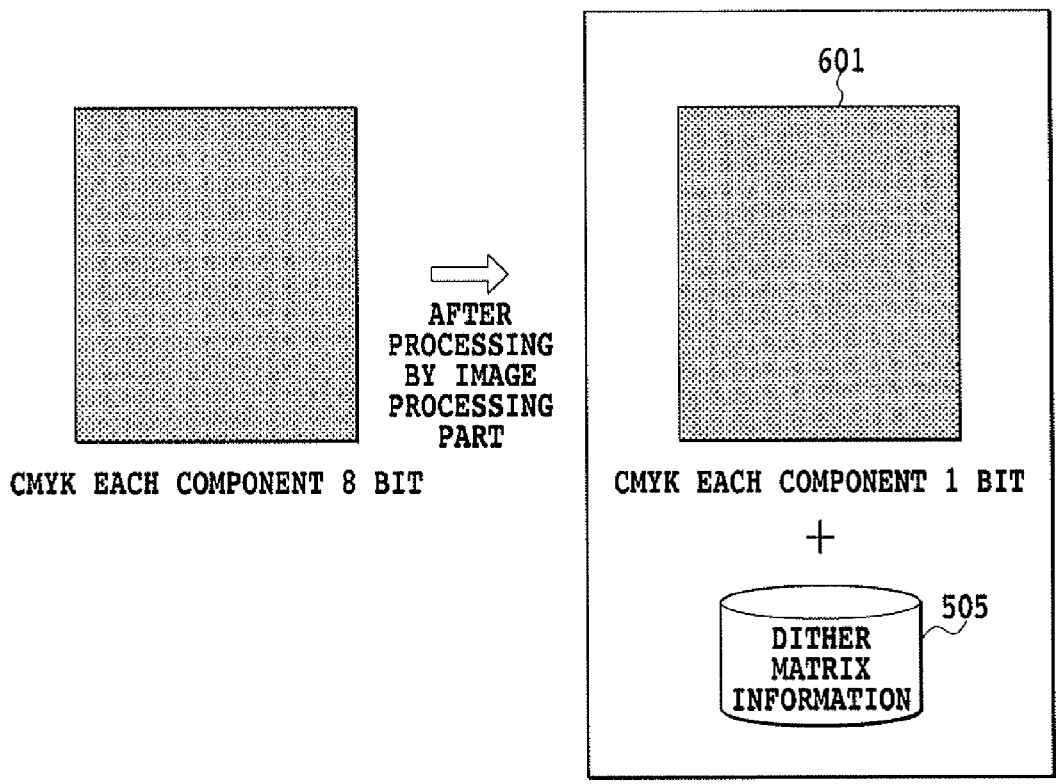
FIG. 6 is diagram showing a storage form of a processing result in an image processing part according to an embodiment of the present invention.

Moreover, the image processing part 181 returns the processed image data to the main controller, and the main controller compresses the received image data using the codec 118 and stores the compressed image data in the DRAM 116 for synchronization with the printer (page spool). At this time, dither matrix information 505 to be described hereinafter is stored together with a processed image 601 as shown in FIG. 6.

In the PDL function operation, the image processing part 181 receives the image data rasterized by the PDL processing from the main controller 111 via the bus I/F 180 and carries out the processing. The PDL function operation does not need the MTF correction 401 and the input color conversion 402 for the image read by the reader section 200, and the processing of these parts is bypassed and the processing of the output color conversion 403 and subsequent steps is executed.

<Configuration of the Graphic Processor>

Next, the operation of the graphic processor 135 provided to the control unit 110 will be described with reference to the drawings.

The graphic processor 135 has a function of receiving the image data from the main controller 111 via the I/F 137, executing the predetermined processing according to an instruction of the main controller 111, and returning the processing result to the main controller 111.

Figure 5:
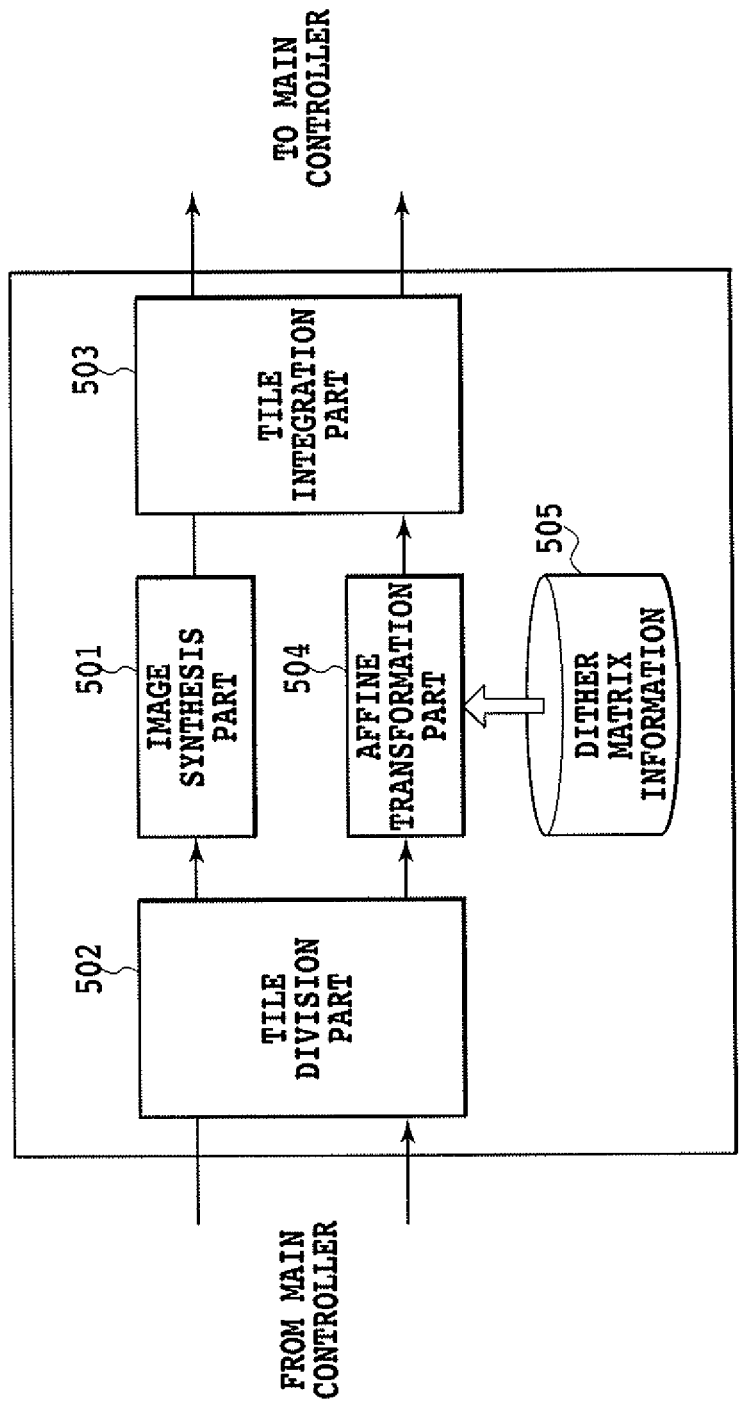
FIG. 5 is a block diagram of a graphic processor in a control unit according to an embodiment of the present invention.

FIG. 5 shows a configuration of respective processing blocks in the graphic processor 135.

A tile division part 502 has a role of dividing a received image signal into fine square tiles. While the size of the tile is instructed by the main controller and can be set optionally, the size is set to a size of the dither matrix for simplicity of explanation in the present embodiment.

Depending on needs, the tile-divided image is sent to an image synthesis part 501 or an affine transformation part 504 by an operation instruction of the main controller 111.

The image synthesis part 501 receives two sets of image data from the main controller and performs synthesis processing on the two sets of stored image data. In the synthesis method, when pixel values for the pixel of interest are A and B in the two sets of image data, respectively, a pixel value of an output image can be calculated by a calculation method such as $A \times B/256$ and $\{A \times \alpha + B \times (256-\alpha)\}/256$ ($\alpha$: synthesis ratio). Alternatively, the pixel value of the output image may be calculated by a calculation method such as one obtaining a larger pixel value between the pixel values A and B. Note that the calculation method is not limited to the above methods.

The image synthesis part 501 has a function of generating the above $\alpha$ and can calculate a from the pixel value of the image data. The data after the synthesis is returned and written in a predetermined-size buffer secured in the SRAM 136 at an appropriate position by a tile integration part 503. After the image synthesis part 501 has finished the processing for all the tiles, the graphic processor 135 reads out the image in the SRAM 136 and transfers the image to the main controller 111.

The affine transformation part 504 performs at least one of the rotation processing and the magnification change processing (enlargement or reduction) on the image data transferred from the main controller 111. That is, in the present embodiment, the affine transformation includes rotation transformation and magnification change transformation (at least one of enlargement transformation and reduction transformation).

The affine transformation part 504 carries out the affine transformation according to a parameter setting necessary for the image rotation and/or magnification change set by the main controller 111. At this time, the image to be processed of the affine transformation part 504 is the screen-processed image 601, and the affine transformation part 504 carries out the processing using the dither matrix information 505 retained together with the image data. The detailed processing of the affine transformation part 504 will be described hereinafter in detail by use of drawings.

Figure 7:
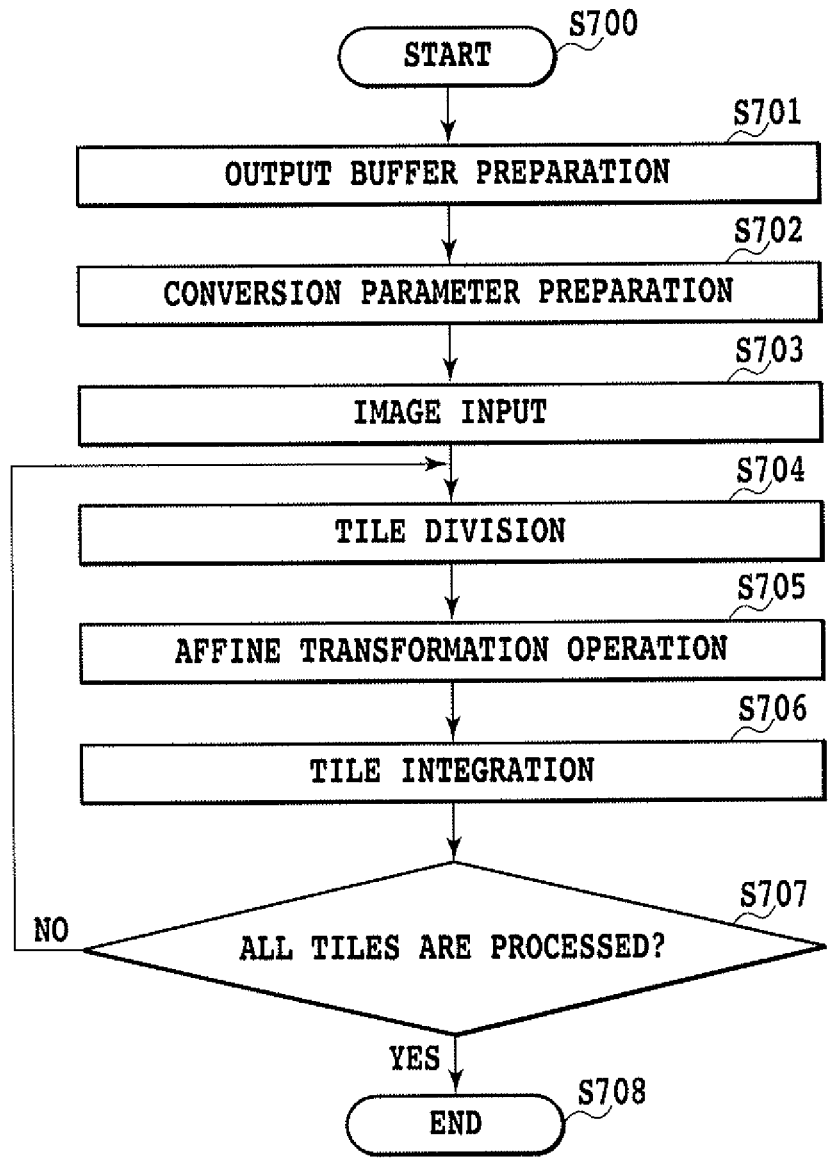
FIG. 7 is a diagram showing a processing flow example of a graphic processor according to an embodiment of the present invention.

A flow example of the processing carried out by the graphic processor 135 in the affine transformation operation will be described by use of FIG. 7.

The graphic processor 135 starts the processing in S700 according to a operation start instruction from the main controller 111.

In S701, the graphic processor 135 secures an output buffer with a size necessary for retaining an image of the processing result in the SRAM 136 according to the setting of the rotation angle and/or magnification change ratio by the main controller 111. Next, in S702, the graphic processor 135 sets a rotation angle and/or a magnification change ratio in the main-scan direction and a magnification change ratio in the sub-scan direction into the affine transformation part 504. In S703, the graphic processor 135 receives image data transfer from the bus controller 113 provided to the main controller 111 and stores the image data temporarily in the SRAM 136.

Figure 8A:
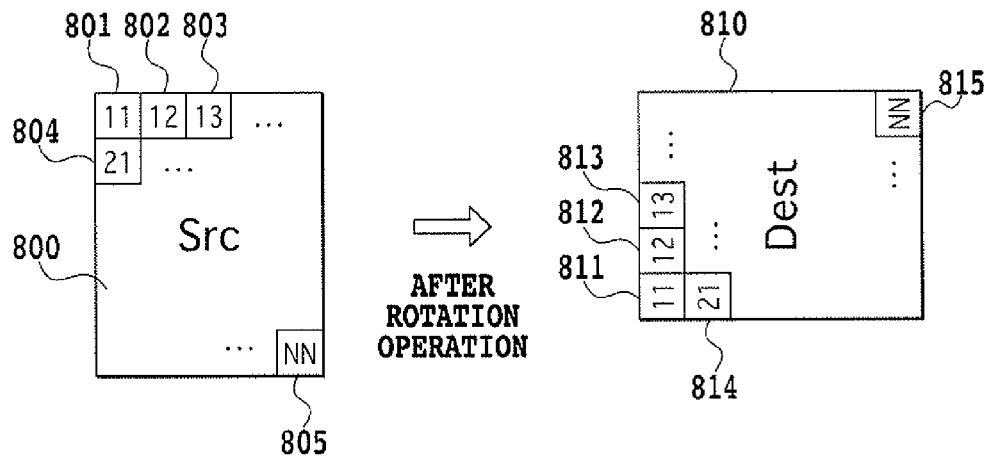
FIGS. 8A and 8B are schematic diagrams of image tiling operations in affine transformation by a graphic processor according to an embodiment of the present invention.

Next, in S704, the graphic processor 135 controls the tile division part 502 so as to divide the image into tiles. The tile division part 502 divides an original image 800 into respective tiles as shown in FIG. 8A according to a set tile size, tile head address, and offset spacing. That is, the image is divided into tiles such as a tile 11 (801), tile 12 (802), tile 13 (803), tile 21 (804), . . . tile NN (805). The graphic processor 135 carries out control of supplying the divided tile images sequentially to the affine transformation part 504.

Next, in S705, the graphic processor 135 controls the affine transformation part 504 so as to carry out the affine transformation according to the setting of the main controller 111. The image subjected to the affine transformation is sent to the tile integration part 503, and, in S706, the graphic processor 135 controls the tile integration part 503 so as to locate the image after the affine transformation in the output buffer secured on the SRAM 136.

FIG. 8A shows a state of integration for the divided tiles after 90 degree rotation. That is, the tile 11 (801), tile 12 (802), tile 13 (803), tile 21 (804), . . . tile NN (805) are rotated into tiles such as 811, 812, 813, 814, . . . 815, respectively, by the 90 degree rotation. The tile integration part 503 locates the tile image rotated by 90 degrees at a predetermined position in the output buffer which is prepared for the 90 degree rotation and obtains a 90 degree-rotated image 810.

Figure 8B:
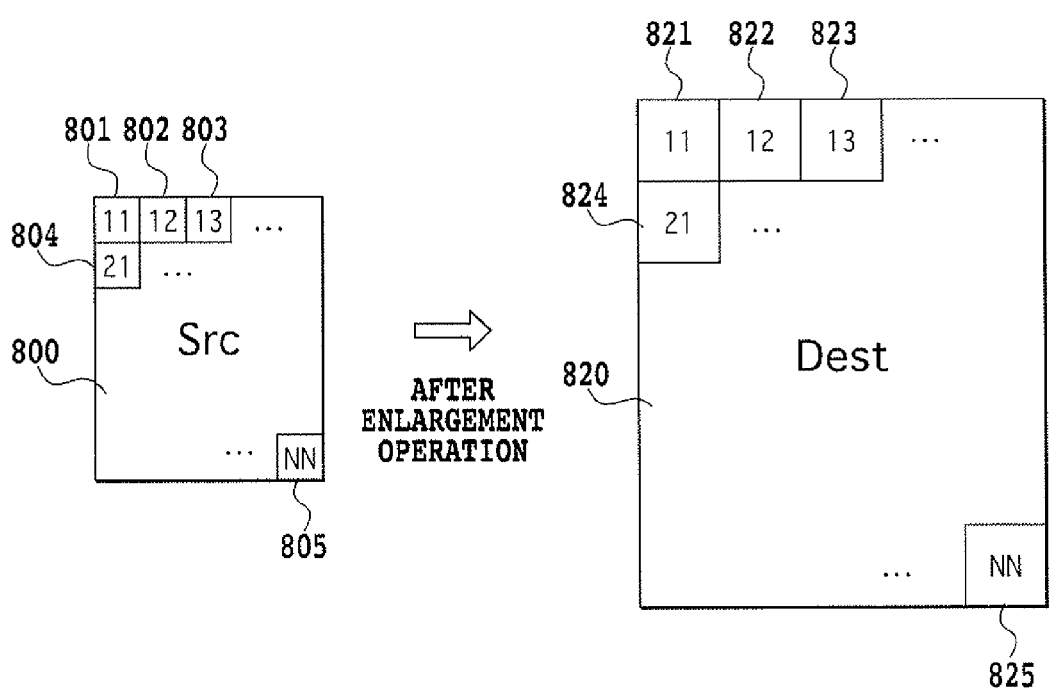

In addition, FIG. 8B shows a state of integration for the divided tiles after the twofold enlargement. The tile 11 (801), tile 12 (802), tile 13 (803), tile 21 (804), . . . tile NN (805) are enlarged in two times by the twofold enlargement into tiles such as 821, 822, 823, 824, . . . 825. The tile integration part 503 locates the tile image enlarged in two times at a predetermined position and obtains a twofold enlarged image 820.

In S707, the graphic processor 135 checks whether or not all the tiles have been processed and returns the process to S704, if all the tiles have not been processed. If all the tiles have been processed, the graphic processor 135 reads out the image after the tile integration from the SRAM 136 and transfers the image to the main controller 111, and then terminates the processing in S708.

<PDL Operation Sequence>

Figure 9:
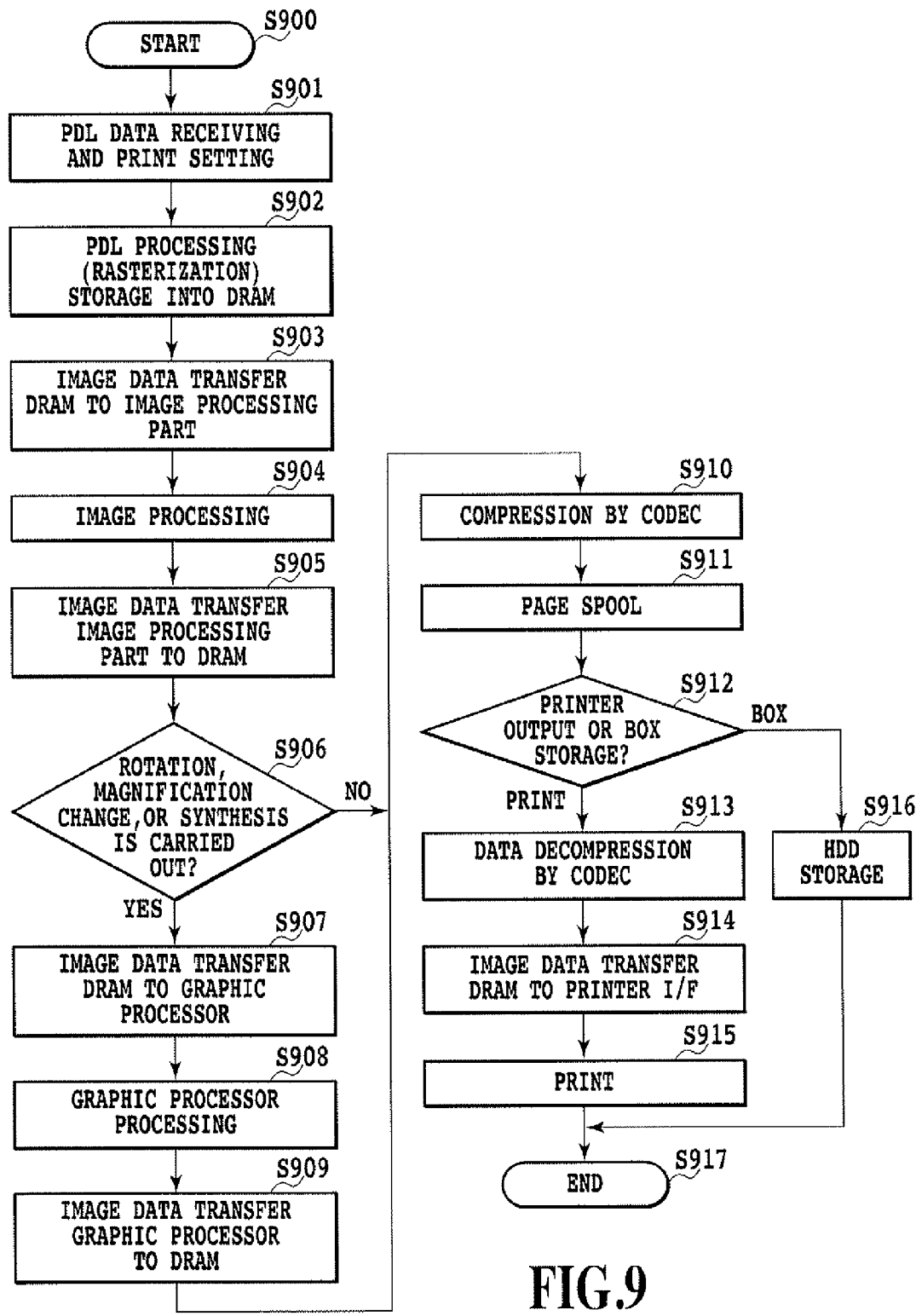
FIG. 9 is a diagram showing a flow example of a PDL processing sequence according to an embodiment of the present invention.

A sequence, in which the CPU 112 on the main controller 111 operates the PDL function using the configuration of the respective parts as described above, will be described by use of the processing flow example of FIG. 9.

In S900, the CPU 112 starts the PDL operation. In S901, the CPU 112 receives the PDL data transmitted from the client PC 11 through the network 10 via the network controller 121 and stores the PDL data into the DRAM 116. At the same time, the CPU 112 carries out print setting according to various kinds of print setting instructions in the PDL data. The specific print setting examples include a finishing processing setting such as the number of prints, a sheet size, and one-side print/both-side print selection and an image processing setting such as selection of the dither to be used.

Next, in S902, the CPU 112 carries out the PDL processing to perform language interpretation and rasterization of the PDL data, and store the rasterized image data into the DRAM 116. In S903, the CPU 112 controls the bus controller 113 so as to transfer the image data from the DRAM 116 to the image processing part 181.

The CPU 112 controls the image processing part 181 so as to perform the image processing using a processing setting according to the print setting in S904 and to transfer the processed image data to the DRAM 116 in S905.

Next, in S906, the CPU 112 determines whether it is necessary or not to carry out the processing of the graphic processor 135 such as the rotation, magnification change, and synthesis, referring to the contents of the print setting in the PDL data. If the processing is necessary, the CPU 112 moves the control to S907, and if the processing is not necessary, the CPU 112 moves the control to S910.

Figure 12A:
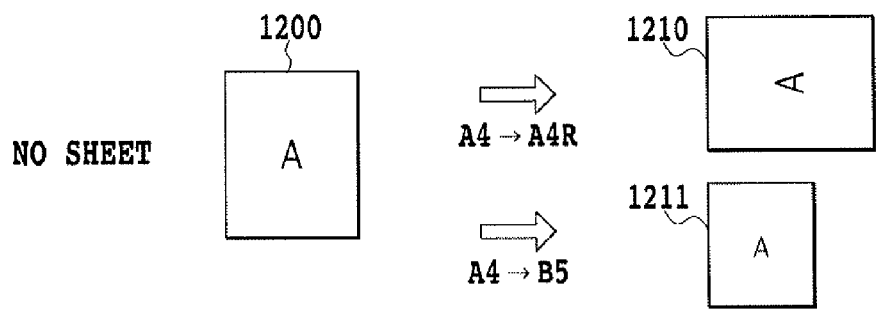
FIGS. 12A, 12B, and 12C are schematic diagrams for cases requiring affine transformation according to an embodiment of the present invention.
Figure 12B:
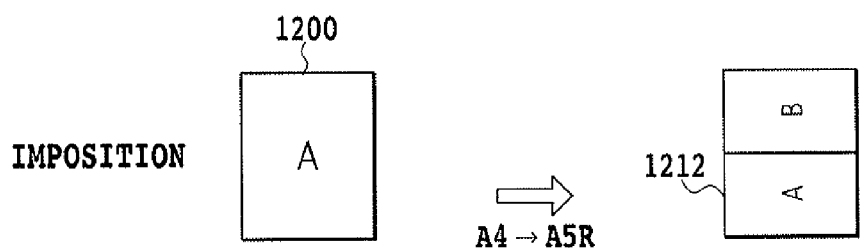
Figure 12C:
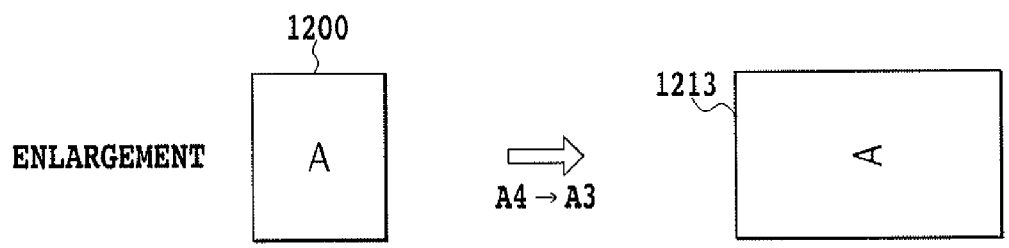

An example of the case requiring the processing of the graphic processor 135 will be described by use of FIG. 12A to FIG. 12C. FIG. 12A shows a case in which a selected sheet is detected running out from a sheet cassette. FIG. 12B shows a case in which an imposition of two in one is selected. Further, FIG. 12C shows a case in which a rasterized image even suitable for a size of A4 is instructed to be output on an A3 sheet. The case of FIG. 12A requires a rotation or reduction operation, the case of FIG. 12B requires a rotation and reduction operation, and the case of FIG. 12C requires a rotation and enlargement operation.

In S907, the CPU 112 controls the bus controller 113 so as to transfer the image data in the DRAM 116 to the graphic processor 135.

The CPU 112 controls the graphic processor 135 so as to perform the predetermined processing in S908 and to transfer the image data subjected to the processing of the graphic processor 135 to the DRAM 116 again in S909.

In S910, the CPU 112 compresses the image data in the DRAM 116 using the codec 118 and writes the compressed data into the DRAM 116 again.

In S911, the CPU 112 controls the bus controller 113 and the I/O controller 126 so as to store the image data in the DRAM 116 temporarily into a spool area of the HD drive 160. This processing is necessary for timing adjustment of synchronization with the printer engine and called page spool.

In S912, the CPU 112 checks whether or not box storing instruction is included in the print setting. Here, the box means a user's data area secured in the HD drive and stores the image data in a page spool format without change. In addition, the image data stored in the box can be previewed on the LCD panel of the operation part 150 or can be printed again by a user's instruction at the operation part 150.

If the box storing instruction exists, the CPU 112 stores the image data in the temporary storage area into the user area in S916 and terminates the processing in S917.

If the box storing instruction does not exist, the CPU 112 carries out data transfer to the printer engine. That is, the CPU 112 carries out control of transferring the page spooled image data to the codec 118 for decompression in S913 and transfers the decompressed image data from the DRAM 116 to the printer I/F 145 in S914. In S915, the CPU 112 sends a data transfer instruction to the printer section 300 and waits for the completion of the print operation. When the print has been completed, the CPU 112 terminates the processing in S917.

<Copy Operation Sequence>

Figure 10:
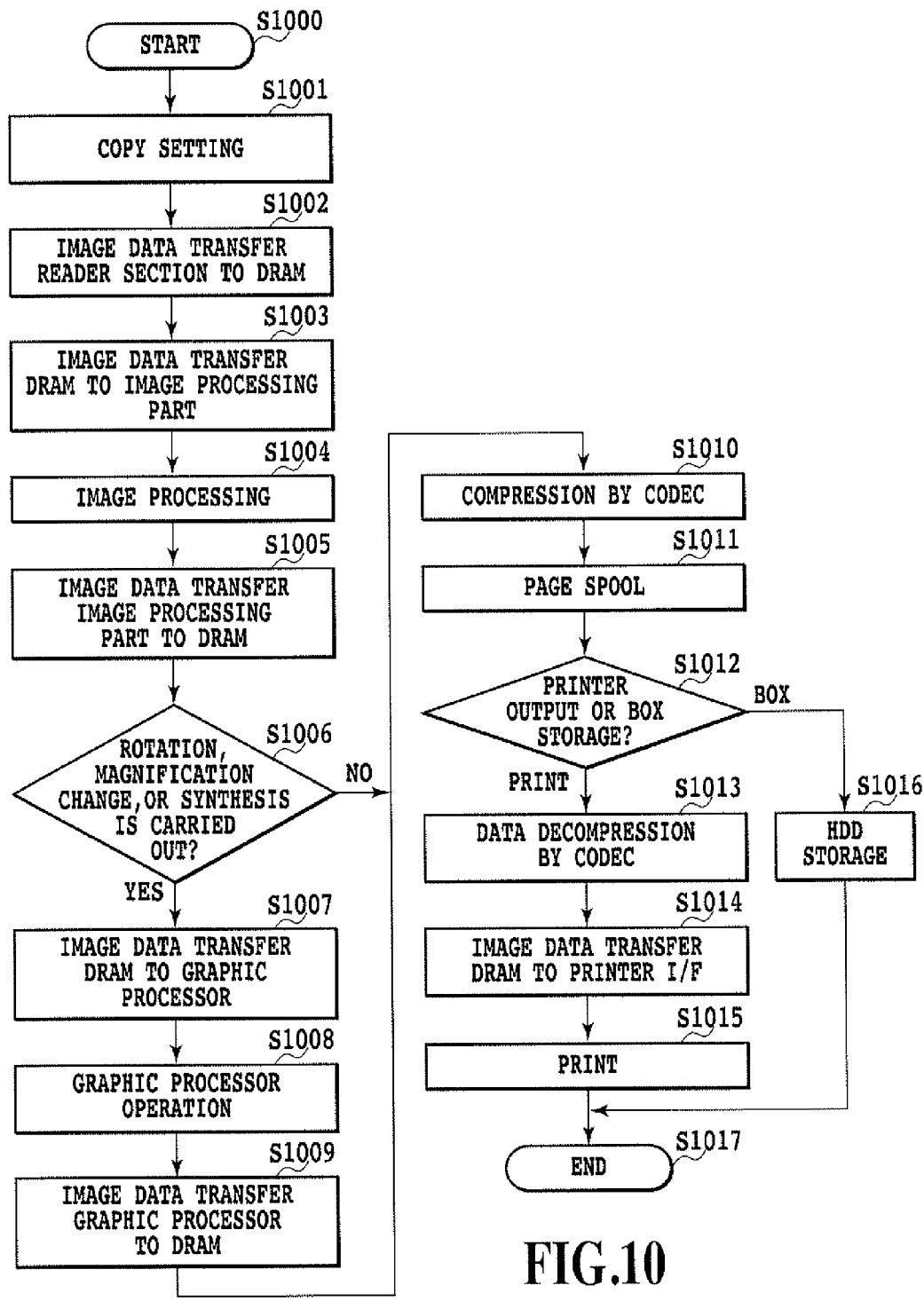
FIG. 10 is a diagram showing a flow example of a copy processing sequence according to an embodiment of the present invention.

Next, a sequence, in which the CPU 112 in the main controller 111 operates the copy function, will be described by use of the processing flow example of FIG. 10.

Differences in the flow of the copy operation from that of the PDL operation are that the image data is read and generated by the reader section 200 and that various kinds of settings such as the finishing setting and the image processing setting are carried out according to a user instruction on the operation part 150.

The CPU 112 starts the copy operation in S1000.

In S1001, the CPU 112 carries out the copy setting for each section according to user's key operation or touch panel operation on the operation part 150.

Next, in S1003, the CPU 112 receives the image data read by the reader section 200 via the scanner I/F and controls each section so as to store the image data into the DRAM 116. At this time, the read operation of the reader section 200 is started by transferring of a scan start instruction by the press down of a copy start key (not shown) on the operation part 150 to the reader section 200 via the scanner I/F.

The following steps are almost the same as those in the above PDL operation.

That is, the image data stored in the DRAM 116 is transferred to the image processing part 181 (S1003 to S1005), and the image data subjected to the image processing is further subjected to the processing of the graphic processor 135 if needed (S1006 to S1009). The image data is page spooled (S1010 and S1011) and then output to the printer (S1013 to S1015) or stored in the box (S1016), according to the setting of the operation part 150 (S1012).

<Box Print Sequence>

Figure 11:
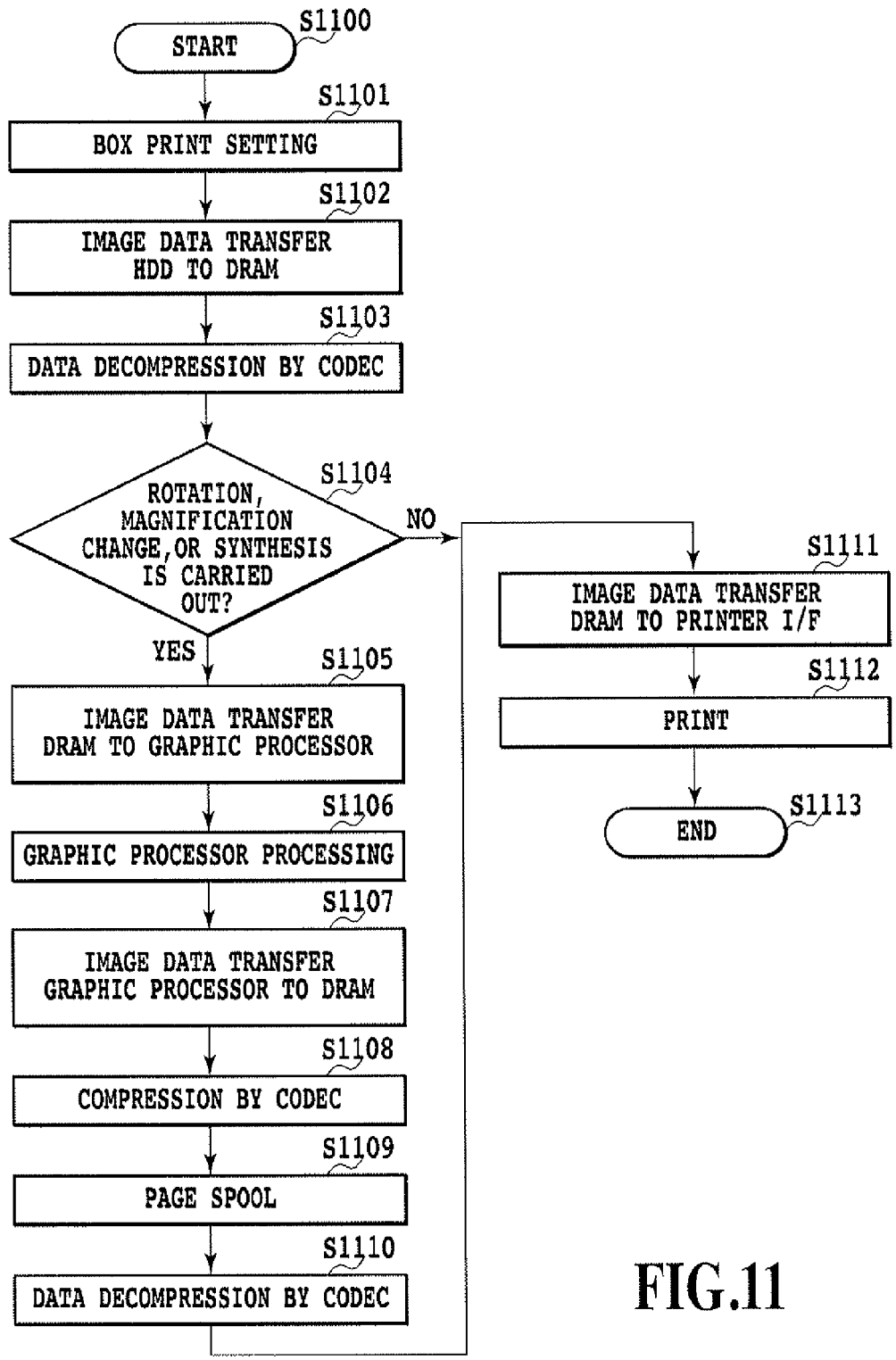
FIG. 11 is a diagram showing a flow example of a box print function sequence according to an embodiment of the present invention.

Next, a sequence, in which the CPU 112 in the main controller 111 operates the box print function printing a box-stored image, will be described by use of the processing flow example of FIG. 11.

In S1101, the CPU 112 carries out box print setting for each part according to user's key operation or touch panel operation on the operation part 150.

In S1102, the CPU 112 controls the I/O controller 126 and the bus controller 113 so as to transfer the image data in the user area of the HD drive 160 to the DRAM 116.

This data is the data compressed by the codec 118. Accordingly, the CPU 112 carries out control of sending a decompression instruction to the codec 118 and transferring the image data from the DRAM 116, and returning the decompressed image data to the DRAM 116 in S1103.

In S1104, the CPU 112 determines whether the processing of the graphic processor 135 such as rotation, magnification change, and synthesis is necessary or not, referring to the box print setting. If necessary, the CPU 112 moves the control to S1106, and, if not necessary, the CPU 112 moves the control to S1111.

When the processing of the graphic processor 135 is necessary, the CPU 112 transfers the data in the DRAM 116 to the graphic processor 135 and controls the graphic processor so as to perform predetermined processing. Subsequently, the CPU 112 carries out control of returning the image data subjected to the processing, to the DRAM 116 again in S1107.

The CPU 112 performs data compression on the image data in the DRAM 116 using the codec 118 in S1108 and performs the page spooling in S1109.

Next, in S1110, the CPU 112, after detecting that the printer engine is ready, controls the codec 118 so as to decompress the page spooled image data and store the decompressed image data into the DRAM 116.

The CPU 112 transfers the image data in the DRAM 116 to the printer I/F 145 in S1111, instructs the print operation in S1112, and terminates the box print sequence in S1113 after the print operation.

<Explanation of the Dither Matrix and the Dither Matrix Information>

Here, the dither matrix 408 used in the screen processing 406 of the image processing part 181 and the dither matrix information 505 used in the affine transformation part 504 of the graphic processor 135 will be described by use of specific numerical value examples.

Figure 13:
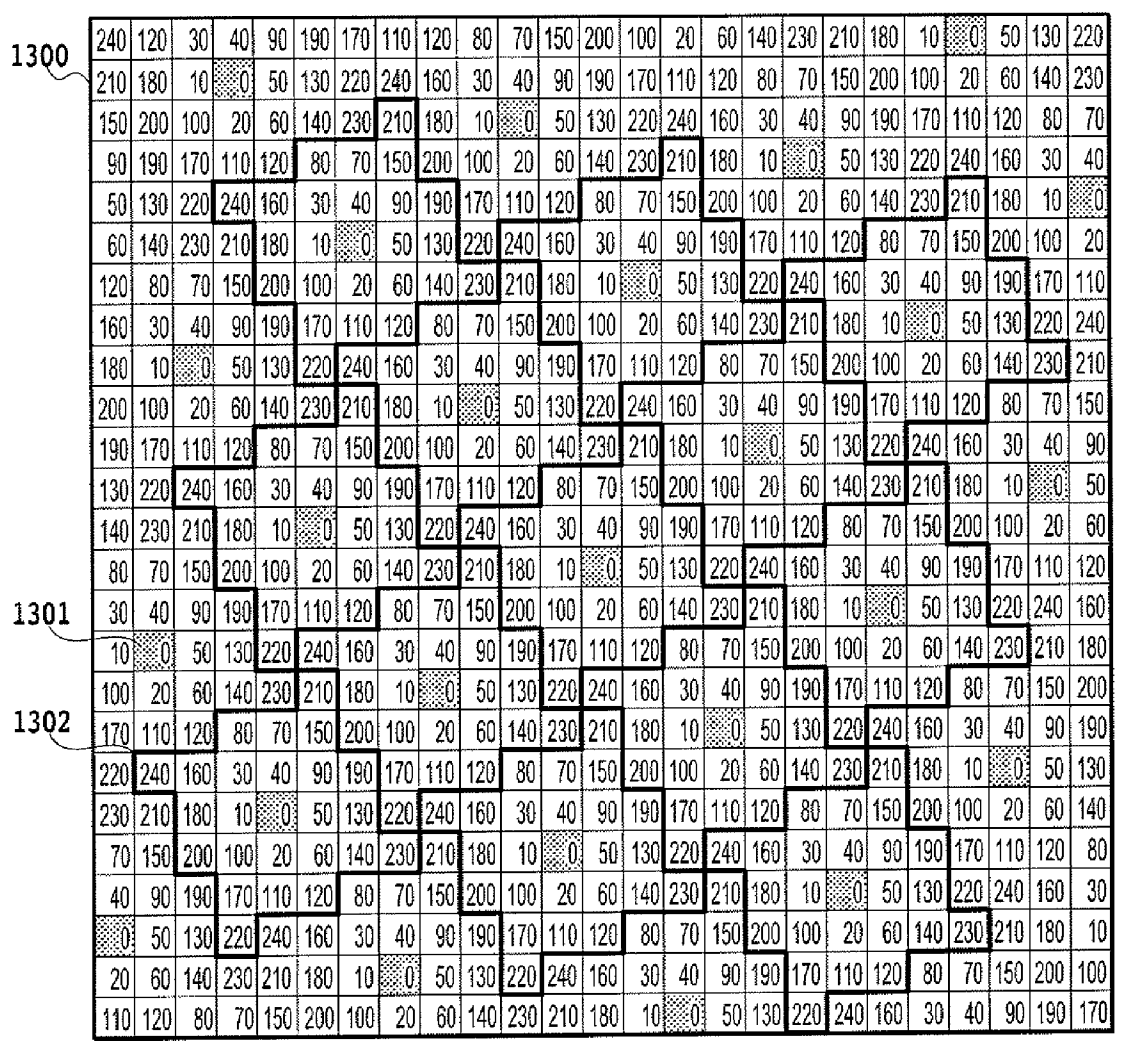

FIG. 13 shows a specific example of the dither matrix 408 necessary when the screen processing 406 carries out the screen processing.

Symbol 1300 shows the numerical values of the dither matrix itself which has a size of 25×25. First, a head address of the dither matrix 1300 is set to a head address of the image (head address of the upper left), and the pixel value of the multi-value code image is compared to the numerical value of the dither matrix 1300 in the screen processing 406. Then, the pixel values of zeros or ones are assigned to the corresponding 25×25 addresses, respectively. When one processing step has finished, the screen processing 406 moves the dither matrix 1300 in the main-scan direction by the size of the dither matrix, that is, 25 pixels, and carries out the same threshold value comparison. When having finished the movement in the main-scan direction, the screen processing 406 moves the dither matrix 1300 in the sub-scan direction by 25 pixels and carries out the same threshold value comparison. In this manner, the screen processing 406 carries out the threshold value comparison while moving the dither matrix 1300 over the entire image without an overlap.

The pixel having a gray background shown by Symbol 1301 is a pixel which has the smallest numerical value in the dither matrix. When an image signal value is sequentially increased from zero, dots grow having a center at this pixel, and thereby this pixel is called a growth core. That is, the growth core is a pixel to become the center of the growth in the screen processing (growth center pixel). The dither matrix 1300 has a plurality of growth cores and a screen line is determined by the positions of the plurality of growth cores.

The area surrounded by the bold line shown by Symbol 1302 shows an area where the dots are growing having a center at the growth core (screen growth pattern area). A dot growth pattern is specified within the area centering the growth core. This area is called a specific area.

Figure 14:
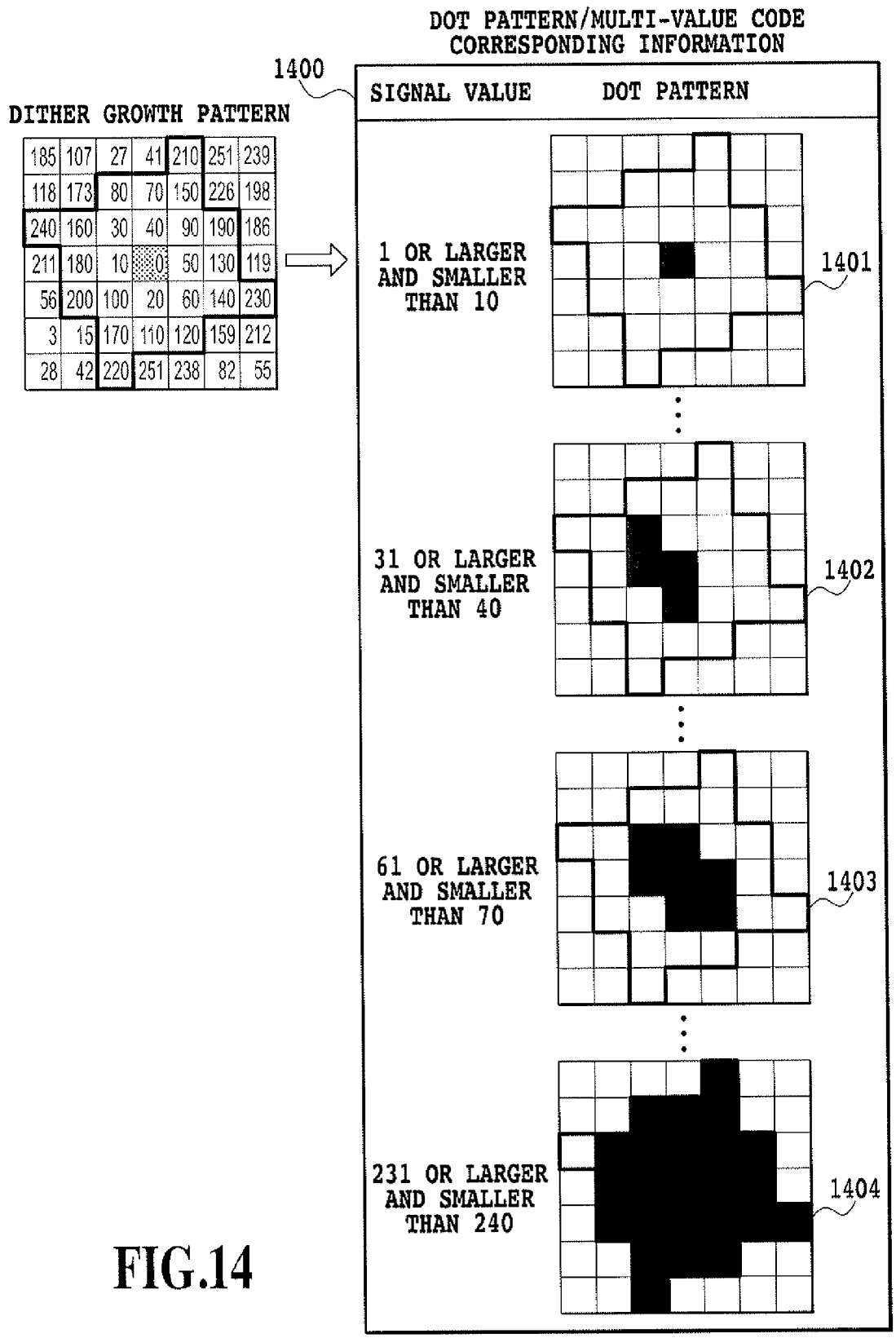
FIG. 14 is a diagram showing a part of dither matrix information according to an embodiment of the present invention.

The dot pattern within the specific area shown by Symbol 1302 can be associated with an input signal value. FIG. 14 shows an example of the association information; dot pattern/multi-value code corresponding information 1400.

Symbol 1400 is an association table of the signal value with the pattern, in which the numerical values of the dither matrix 1300 are compared with numerical values of 0 to 255 for bit width signals of the input image, and one is assigned for the case of a larger signal value and zero is assigned for the case of a smaller signal value. That is, the dot pattern/multi-value code corresponding information 1400 can work as a table associating each signal value with the corresponding dot pattern. Thereby, referring to the dot pattern/multi-value code corresponding information 1400, it is possible to obtain a signal value corresponding to a certain dot pattern and to obtain a dot pattern corresponding to a certain signal value.

For example, the dot pattern shown by Symbol 1401 corresponds to a signal value of one or larger and smaller than ten, and the dot pattern shown by Symbol 1402 corresponds to a signal value of 31 or larger and smaller than 40. Further, the dot pattern shown by Symbol 1403 corresponds to a signal value of 61 or larger and smaller than 70, and the dot pattern shown by Symbol 1404 corresponds to a signal value of 231 or larger and smaller than 240.

Such an association table is preliminarily generated and retained for each of all the signal values and stored in the SRAM 136 connected to the graphic processor 135 as a part of the dither matrix information 505.

In this manner, the present embodiment causes the dot pattern in the specific area, which is associated with the growth core in the point of the dot growth, to be multi-value information (multi-value code) according to the predetermined signal value.

Figure 15:
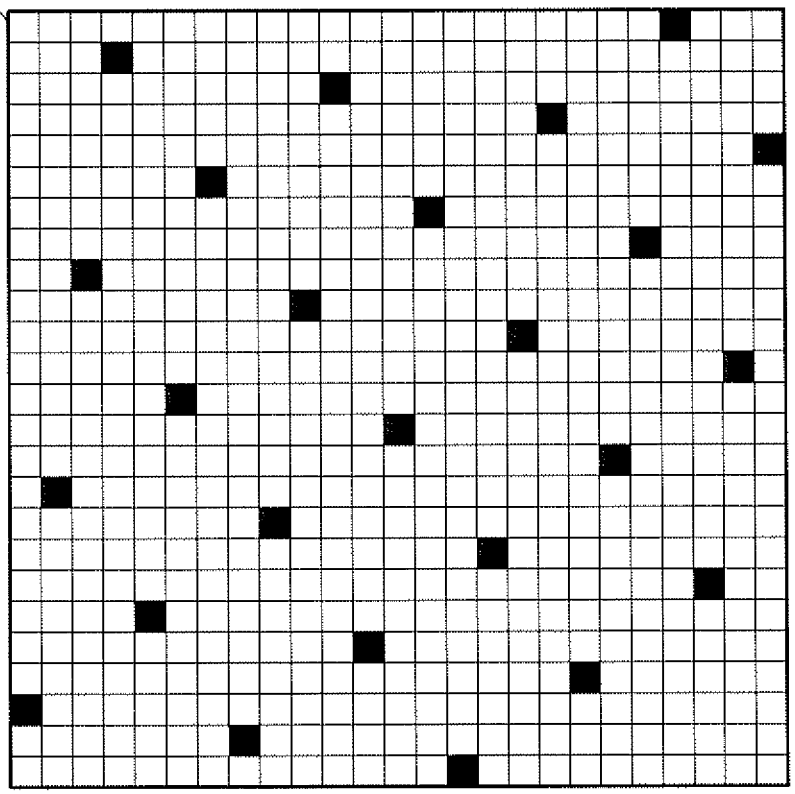
FIG. 15 is a diagram showing another part of dither matrix information according to an embodiment of the present invention.
Figure 15:
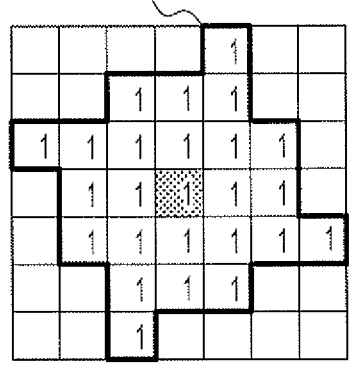

Further, FIG. 15 shows examples of a growth core coordinates 1501 and a specific area coordinate pattern 1502. These sets of information are determined when the dither matrix 1300 is designed and provided together with the dither matrix 1300. Also the growth core coordinates 1501 and the specific area coordinate pattern 1502 are stored in the SRAM 136 as a part of the dither matrix information 505.

<Configuration and Operation of the Affine Transformation Part>

Figure 16:
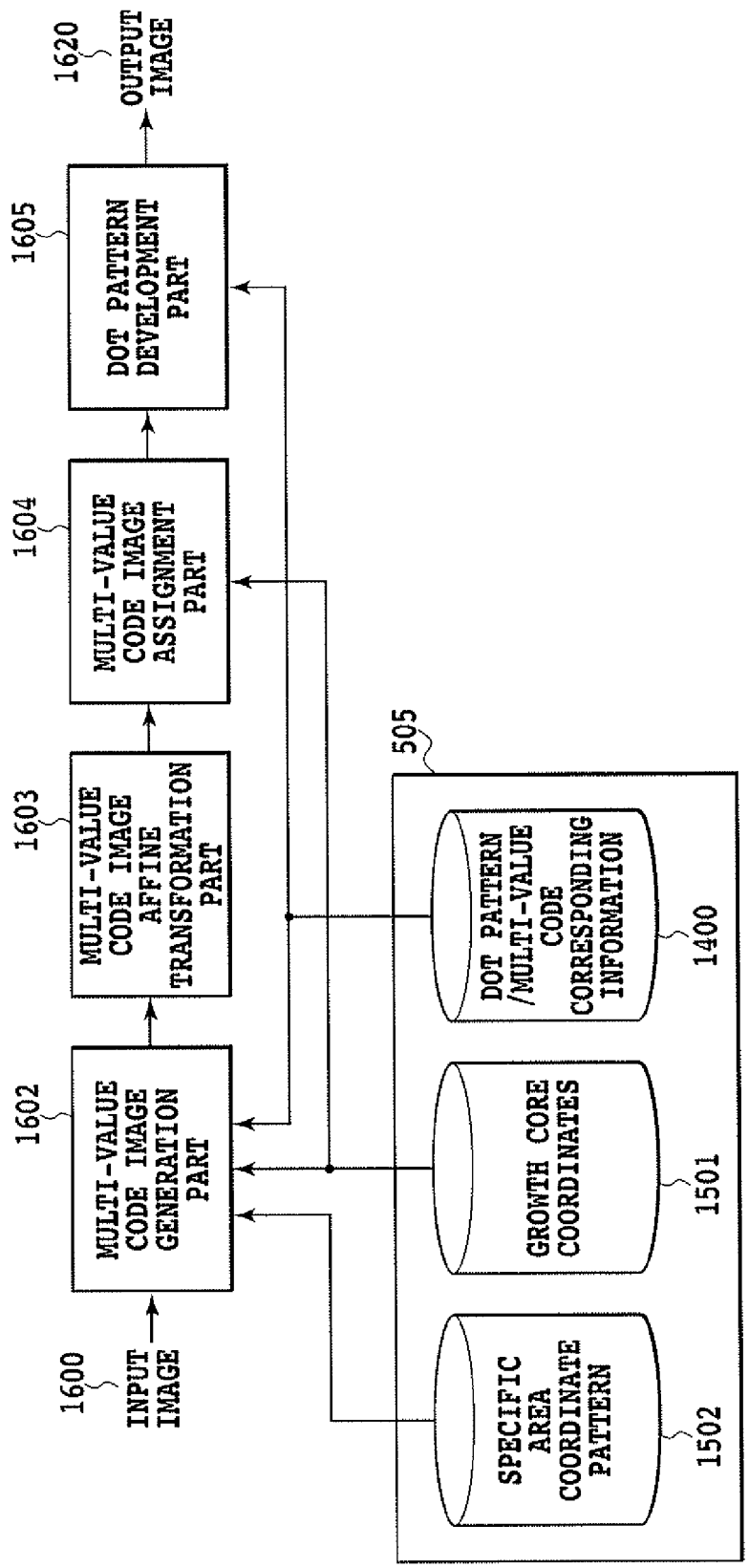
FIG. 16 is a block configuration diagram of an affine transformation part according to an embodiment of the present invention.
Figure 17:
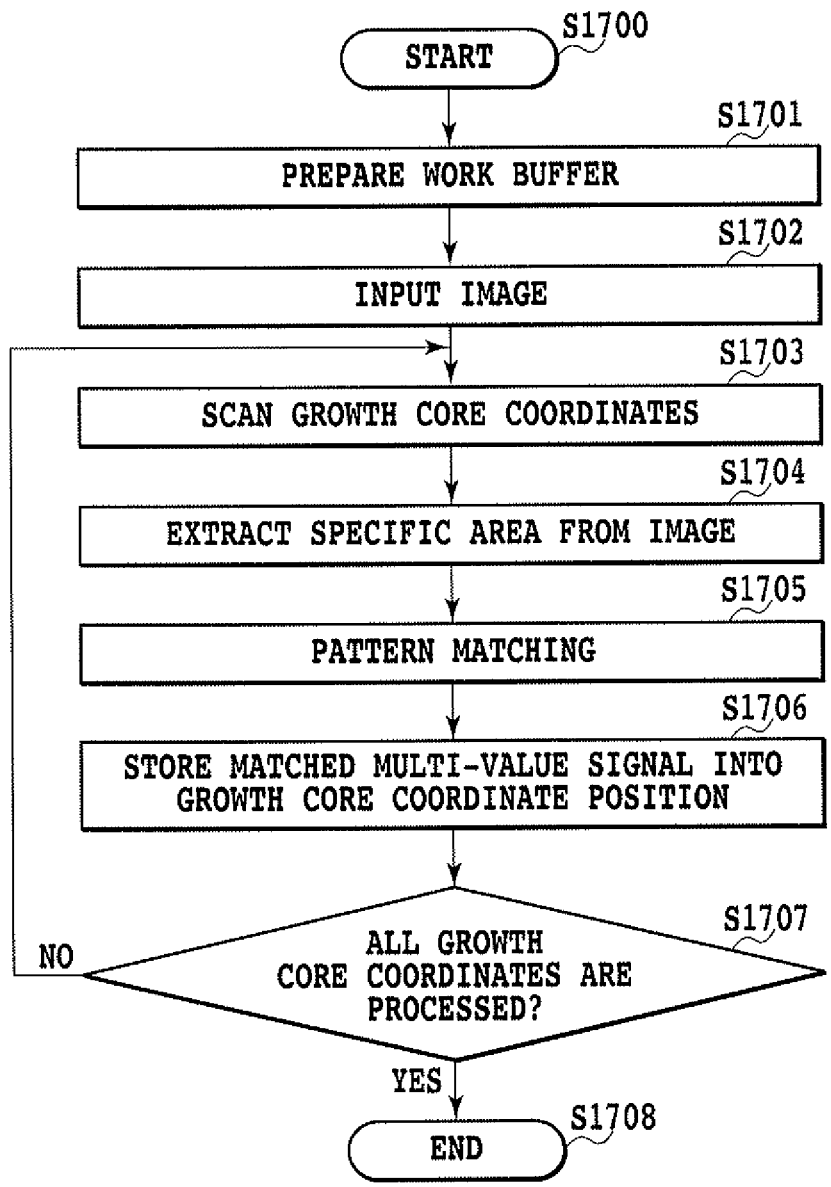
FIG. 17 is a diagram showing a processing flow example of a multi-value code image generation part according to an embodiment of the present invention.

Next, the configuration and operation of the affine transformation part 504 provided to the graphic processor 135 will be described by use of the block diagram shown in FIG. 16 and flow examples shown in FIG. 17 and FIG. 18.

A multi-value code image generation part 1602 is a block converting an input image 1600 input after the tile division into a multi-value code image using the growth core coordinates (growth center coordinates) 1501 and the dot pattern/multi-value code corresponding information 1400. Note that the input image 1600 is an image subjected to the screen processing using the dither matrix.

The processing of the multi-value code image generation part 1602, which outputs the multi-value code image from the input image of the dot patter within the extracted specific area, will be described by use of the flow example shown in FIG. 17.

The multi-value code image generation part 1602 starts the processing in S1700.

In S1701, the multi-value code image generation part 1602 prepares a buffer in the SRAM 136 for the output of the multi-value code image. The size of this buffer may be the same as that of the tile image.

Next, in S1702, the multi-value code image generation part 1602 receives the input image 1600 which has been tile-divided in the tile division part 502.

In S1703, the multi-value code image generation part 1602 scans the growth core coordinates in the image received in S1702 using the growth core coordinates 1501 in a sequence; from left to right, down by one line, and then from left to right, for example. That is, the multi-value code image generation part 1602 extracts the growth core coordinates (growth center coordinates) by collating the coordinate positions of a pixel with the minimum value in the dither matrix to be used and the pixel in the input image 1600 after the tile division.

In S1709, the multi-value code image generation part 1602 extracts a dot pattern of the specific area centering the growth core found by the scan using the specific area coordinate pattern 1502. For carrying out this extraction, the multi-value code image generation part 1602 may extract a dot pattern obtained by OR of the dot pattern within the specific area centering the growth core coordinates in the input image 1600 after the tile division and the specific area coordinate pattern 1502. The extracted dot pattern is stored into the SRAM 136.

Figure 19:
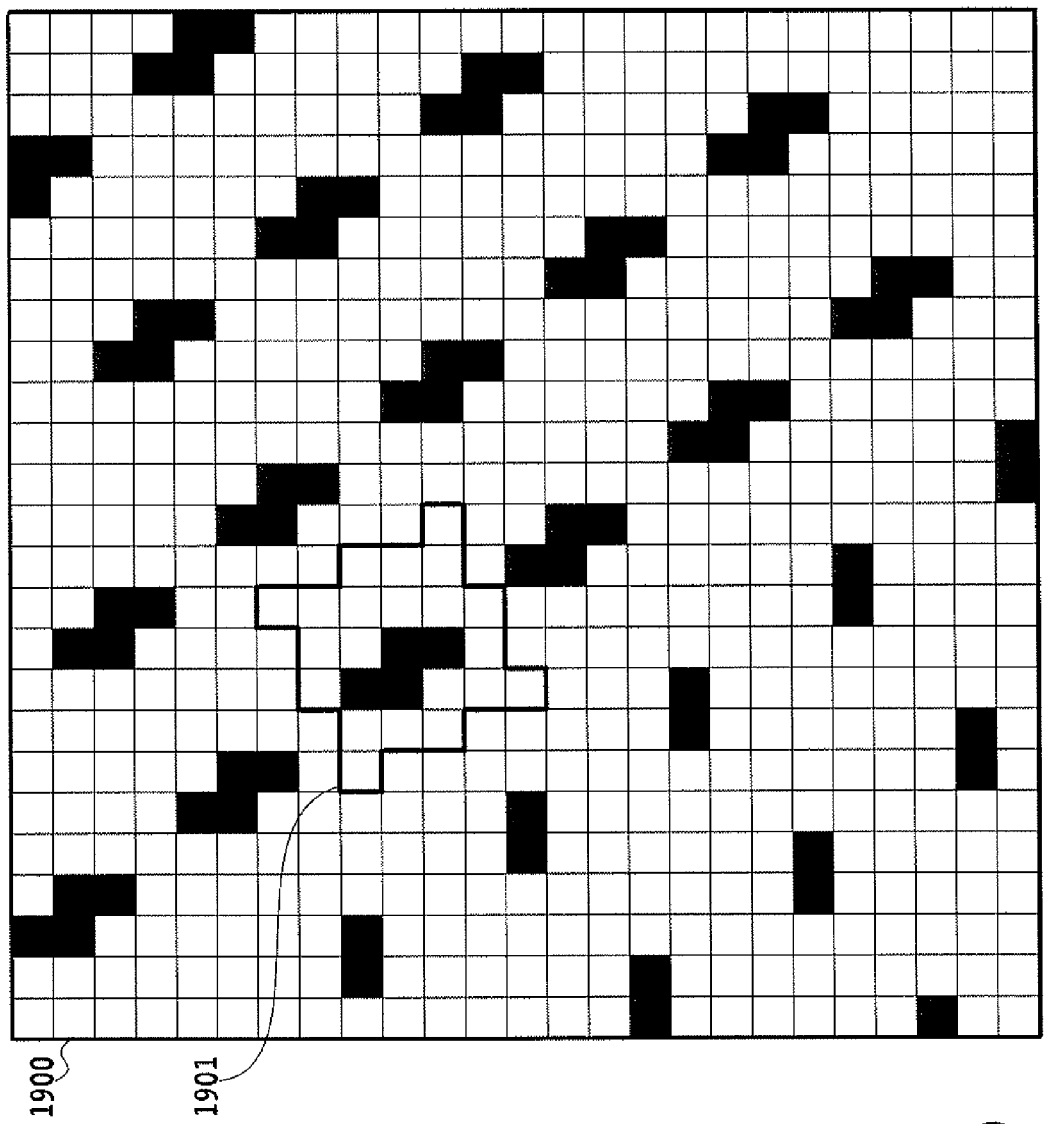
FIG. 19 is a diagram showing an example of an input image to an affine transformation part according to an embodiment of the present invention.

FIG. 19 shows an input image 1900 which is an example of the input image and a specific area 1901 which is an example of the extracted specific area. In this example, a dot pattern composed of four-bit ON pixels (pixels exceeding a threshold value) exists within the specific area 1901.

In S1705, the multi-value code image generation part 1602 carries out pattern matching between the dot pattern within the extracted specific area and the dot pattern within the dot pattern/multi-value code corresponding information 1400. For the pattern matching, a product-sum operation of the dot pattern in each of the extracted specific areas and all the dot patterns retained in Symbol 1400 is carried out and the pattern having the largest value may be employed as a matched pattern. As shown in FIG. 14, the dot pattern is associated with the signal value. Accordingly, the multi-value code image generation part 1602 outputs the signal value corresponding to the matched dot pattern as a multi-value code. In S1706, the multi-value code image generation part 1602 stores the multi-value code output in S1705 into the output buffer secured in the SRAM 136 at the growth core coordinate position.

In this manner, the multi-value code image generation part 1602 encodes the dot pattern existing in each specific area and assigns a multi-value code of the encoding as a pixel value of the growth core coordinates in the corresponding specific area. That is, the multi-value code image generation part 1602 provides the multi-value code, which has been obtained by the multi-value encoding of the dot pattern, to the growth core coordinate position before the affine transformation (e.g. before rotation), as a pixel value. This multi-value code assigned to the growth core coordinate position is called a multi-value code pixel value. The multi-value code pixel value functions as dot pattern code information.

In S1707, the multi-value code image generation part 1602 checks whether or not all the growth cores have been subjected to the multi-value encoding processing, and, if not, returns the process to S1703 and continues the processing for the growth core which has not been processed. If all the growth cores have been subjected to the processing, the multi-value code image generation part 1602 terminates the process in S1708 and transfers the process to a multi-value code image affine transformation part 1603. At this time, the image which is transferred from the multi-value code image generation part 1602 to the multi-value code image affine transformation part 1603 includes a multi-value code pixel value and thereby is called a multi-value code image.

Figure 20:
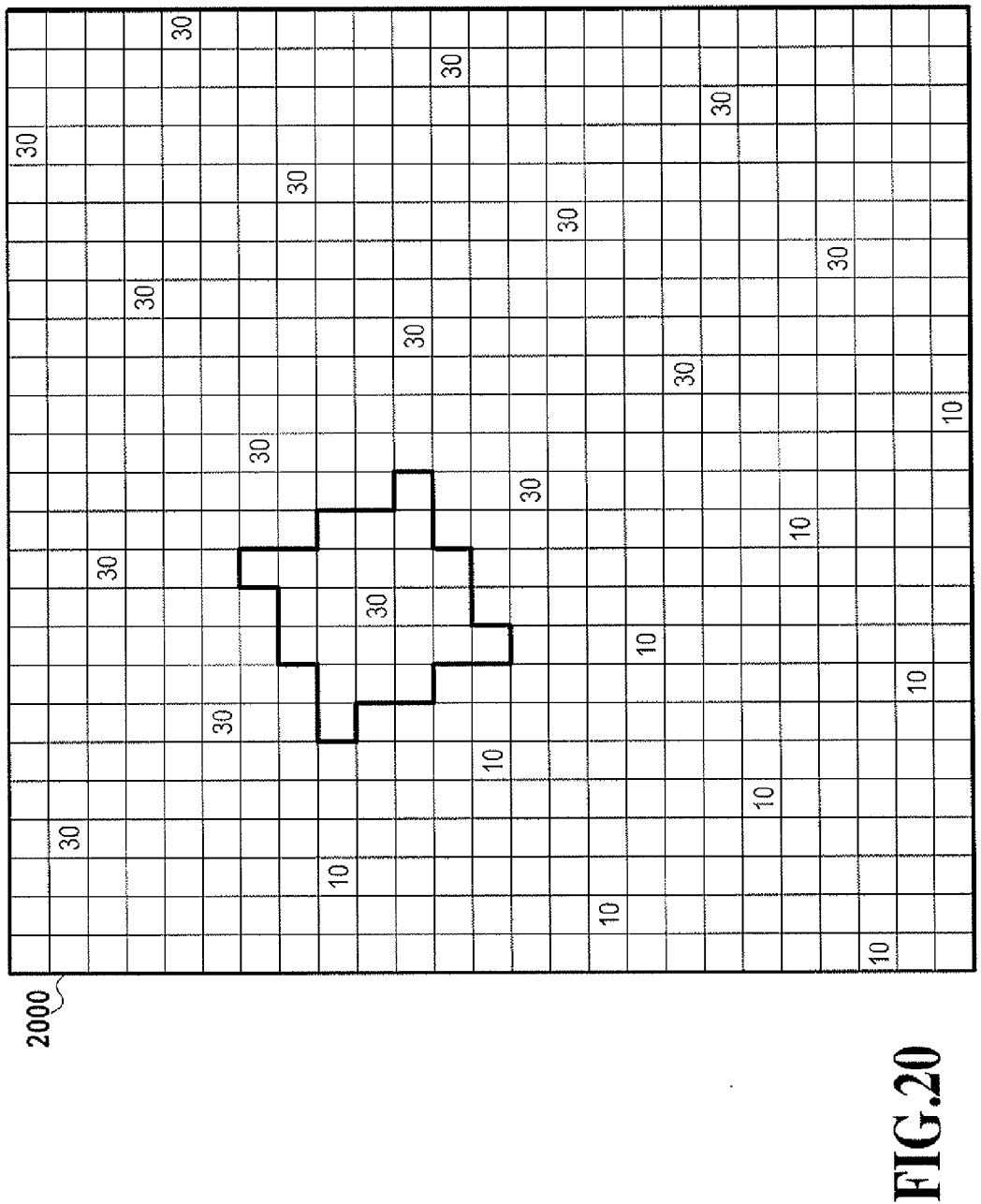
FIG. 20 is a diagram showing a processing result example in a multi-value code image generation part according to an embodiment of the present invention.

FIG. 20 shows an example of an image of the processing result in the multi-value code image generation part 1602 (multi-value code image). A multi-value code image 2000 is an image having the multi-value code 30 or 10 corresponding to the dot pattern included in the specific area, at the growth core coordinate position as a pixel value.

Next, the operation of the multi-value code image affine transformation part 1603 will be described.

The multi-value code image affine transformation part 1603 has a function of performing rotation and/or magnification change by the following formula on the multi-value code image input from the multi-value code image generation part 1602.

$$I(xd, yd) \Leftarrow I(xs, ys) \quad \text{(Formula 1)}$$

$$\begin{pmatrix} xd \\ yd \end{pmatrix} = \begin{pmatrix} A & B \\ C & D \end{pmatrix} \begin{pmatrix} xs \\ ys \end{pmatrix}$$

Here, I(x, y) indicates a pixel value at coordinates (x, y), (xs, ys) indicates coordinates before coordinate conversion, and (xd, yd) indicates coordinates after the coordinate conversion. The numerical values in the matrix A, B, C and D are determined appropriately by an affine transformation setting. The coordinate value after the coordinate conversion is rounded into an integer value. Note that the coordinates of a rotation center or a magnification change center is set to an upper left coordinate origin. While, strictly speaking, coordinate system conversion is necessary before the above matrix conversion in this case, the coordinate system conversion will be omitted for simplicity of explanation.

Further, the multi-value code image affine transformation part 1603 secures a sufficient output buffer in the SRAM 136 according to an affine transformation parameter. For example, for 200% enlargement, multi-value code image affine transformation part 1603 secures the output buffer two times as large as the tile image size.

Next, a specific numerical value example of this matrix and a processing result will be described for the case of 90 degree counter-clockwise rotation and the case of 75% reduction, for example.

1) For the 90 degree rotation, the above matrix becomes the following rotation matrix.

$$\begin{pmatrix} \cos\theta & -\sin\theta \\ \sin\theta & \cos\theta \end{pmatrix} \quad \text{(Formula 2)}$$

Here, θ in the rotation matrix is 90 degrees.

Figure 21:
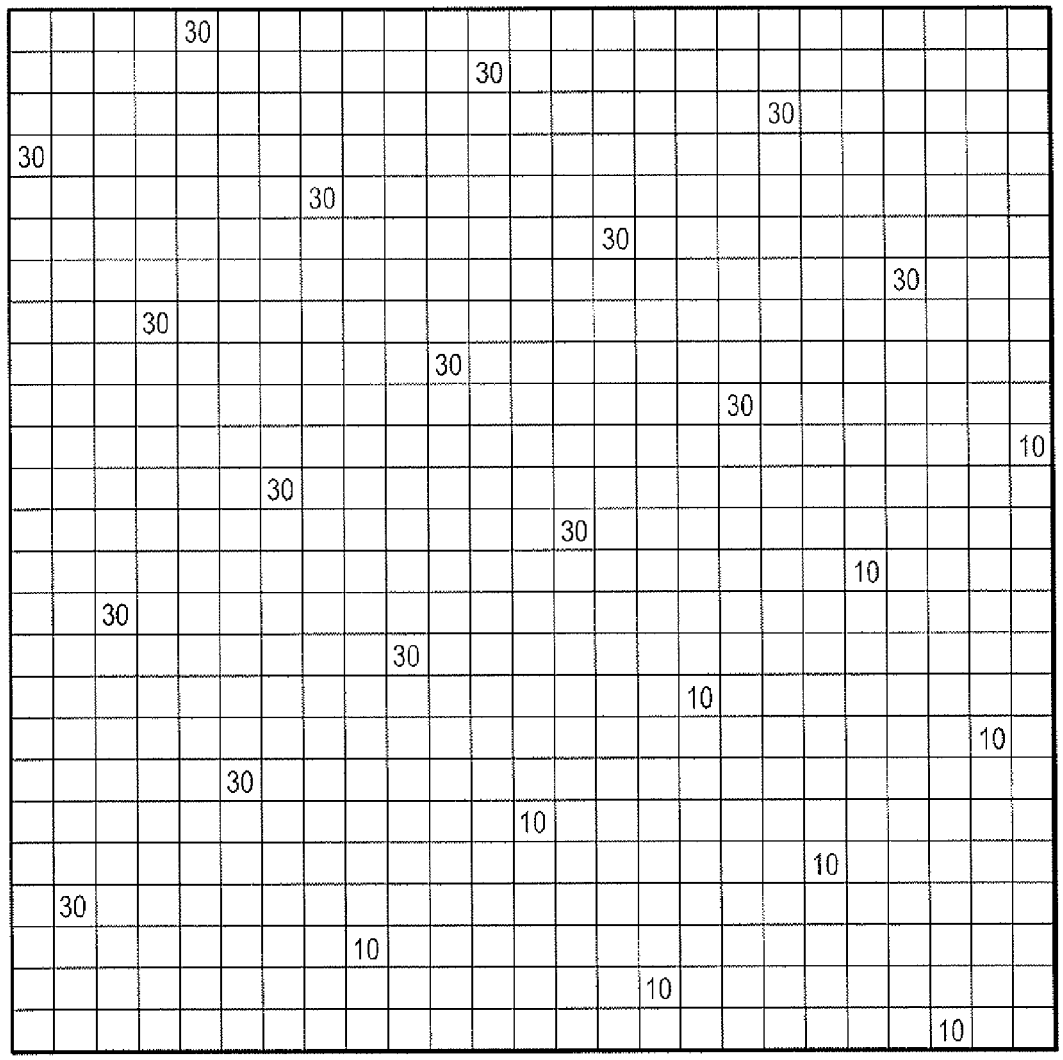
FIG. 21 is a diagram showing a processing result example in a multi-value code affine transformation part for 90 degree rotation according to an embodiment of the present invention.

FIG. 21 shows a processing result example of the 90 degree counter-clockwise rotation for the multi-value code image shown in FIG. 20 by the coordinate conversion using this matrix.

2) For the 75% reduction, the above matrix is given as the following matrix.

$$\begin{pmatrix} 0.75 & 0 \\ 0 & 0.75 \end{pmatrix} \quad \text{(Formula 3)}$$

Figure 24:
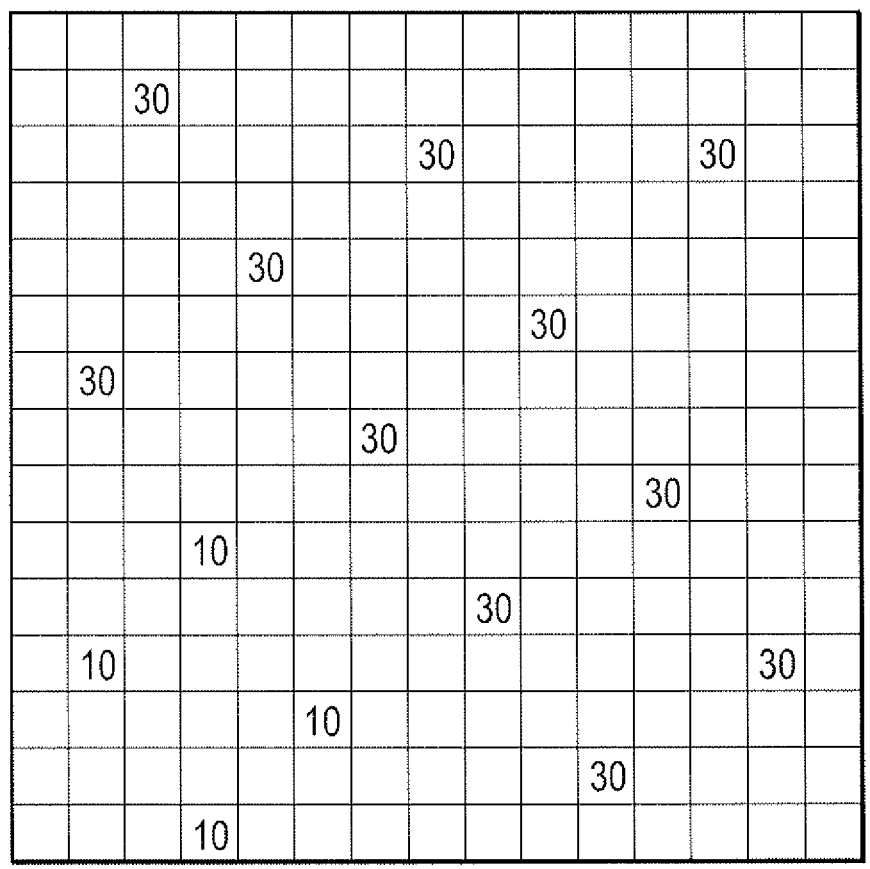
FIG. 24 is a diagram showing a processing result example in a multi-value code image affine transformation part for 75% reduction according to an embodiment of the present invention.

FIG. 24 shows a processing result example of the 75% reduction for the multi-value code image shown in FIG. 20 by the coordinate conversion using this matrix.

Both examples show that the coordinate position having the multi-value code pixel value such as one generated by the multi-value code image generation part 1602 moves from the growth core coordinates before the affine transformation. That is, the growth core coordinates before the affine transformation and the coordinates having the multi-value code pixel value after the affine transformation (growth core coordinates after the affine transformation) are sometimes different from each other. The multi-value code image affine transformation part 1603 stores the multi-value code image after the affine transformation as shown in FIG. 21 and FIG. 24 into the output buffer prepared in the SRAM 136.

While the matrix numerical value examples are shown in the above examples respectively for the rotation and magnification change which are independent from each other, when the rotation and the magnification change are carried out at the same time, the coordinate conversion may be carried out using a product of the matrices. Further, it is obvious that the rotation angle is not limited to −90 degrees or the magnification change ratio is not limited to 75% in reduction.

Figure 18:
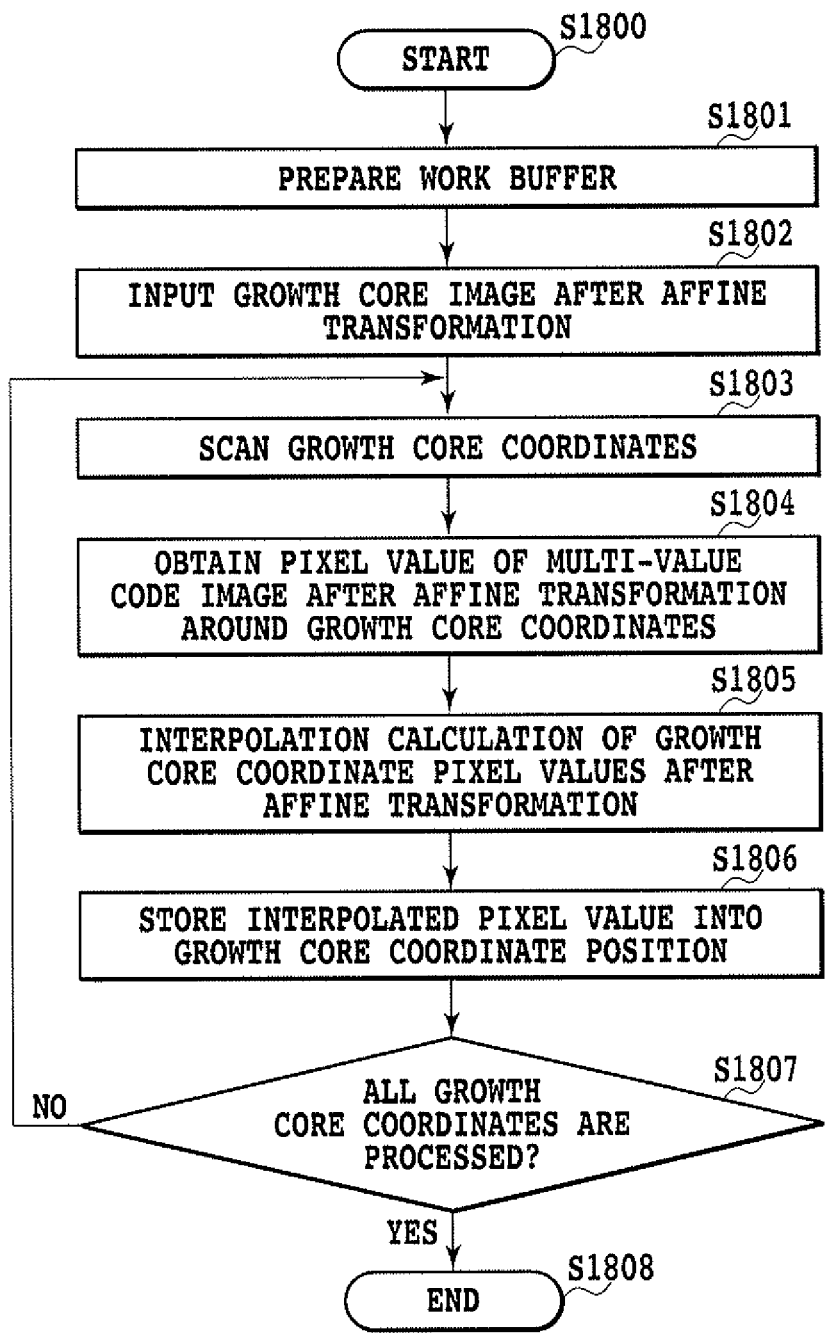
FIG. 18 is a diagram showing a processing flow example of a multi-value code image assignment part according to an embodiment of the present invention.

Next, a multi-value code image assignment part 1604 carries out the flow shown in FIG. 18 for the input of the multi-value code image subjected to the affine transformation in the multi-value code image affine transformation part 1603. The following will describe the processing outputting an image such as one having the multi-value code as a pixel value at the growth core before the affine transformation, using the flow example of FIG. 18.

The multi-value code image assignment part 1604 starts the processing in S1800.

In S1801, the multi-value code image assignment part 1604 prepares an output buffer having the same size as that of the tile image after the affine transformation in the SRAM 136.

Next, in S1802, the multi-value code image assignment part 1604 reads out the multi-value code image after the affine transformation by the multi-value code image affine transformation part 1603, from the SRAM 136.

In S1803, the multi-value code image assignment part 1604 scans the growth core coordinates of the used dither matrix on the multi-value code image after the affine transformation (coordinates corresponding to the growth core coordinates before the affine transformation) using the growth core coordinates 1501.

In S1804, for the growth core coordinates before the affine transformation which has been found by the scanning, the multi-value code image assignment part 1604 searches for a predetermined number of pixels each having the multi-value code around the growth core coordinates as a pixel value (growth cores after the affine transformation). Subsequently, the multi-value code image assignment part 1604 obtains the pixel position and the pixel value thereof. That is, the multi-value code image assignment part 1604 detects at least one growth core after the affine transformation neighboring close to the found growth core before the affine transformation. Here, the search operation is realized by expanding an N×N area centering the growth core until the multi-value code pixel (growth core after the affine transformation) is found.

In S1805, when a plurality of growth cores after the transformation is obtained in S1804, the multi-value code image assignment part 1604 carries out interpolation calculation using a plurality of pixel values corresponding to the above growth cores after the transformation. The interpolation calculation here may be carried out using linear interpolation. The pixel value obtained by this interpolation calculation functions as the dot pattern code information representing the dot pattern, and is assigned as a pixel value of the growth core before the affine transformation in the multi-value code image after the affine transformation as described below.

In S1806, the multi-value code image assignment part 1604 assigns the interpolated pixel value to a position of the growth core scanned in S1803 (corresponding to the growth core coordinates before the affine transformation) and stores the interpolated pixel value into the buffer in the SRAM 136.

In S1807, the multi-value code image assignment part 1604 checks whether or not all the growth cores scanned in S1803 have been processed, and returns the process to S1803, if all the growth cores have not been processed. If all the growth cores have been processed, the process is terminated in S1808.

In this manner, the multi-value code image assignment part 1604 assigns the dot pattern code information to each of the growth cores before the affine transformation in the multi-value code image after the affine transformation. That is, according to first dot pattern code information of at least one closely neighboring growth core after the affine transformation, the multi-value code image assignment part 1604 assigns second dot pattern code information to each of the above growth cores before the affine transformation.

Figure 22:
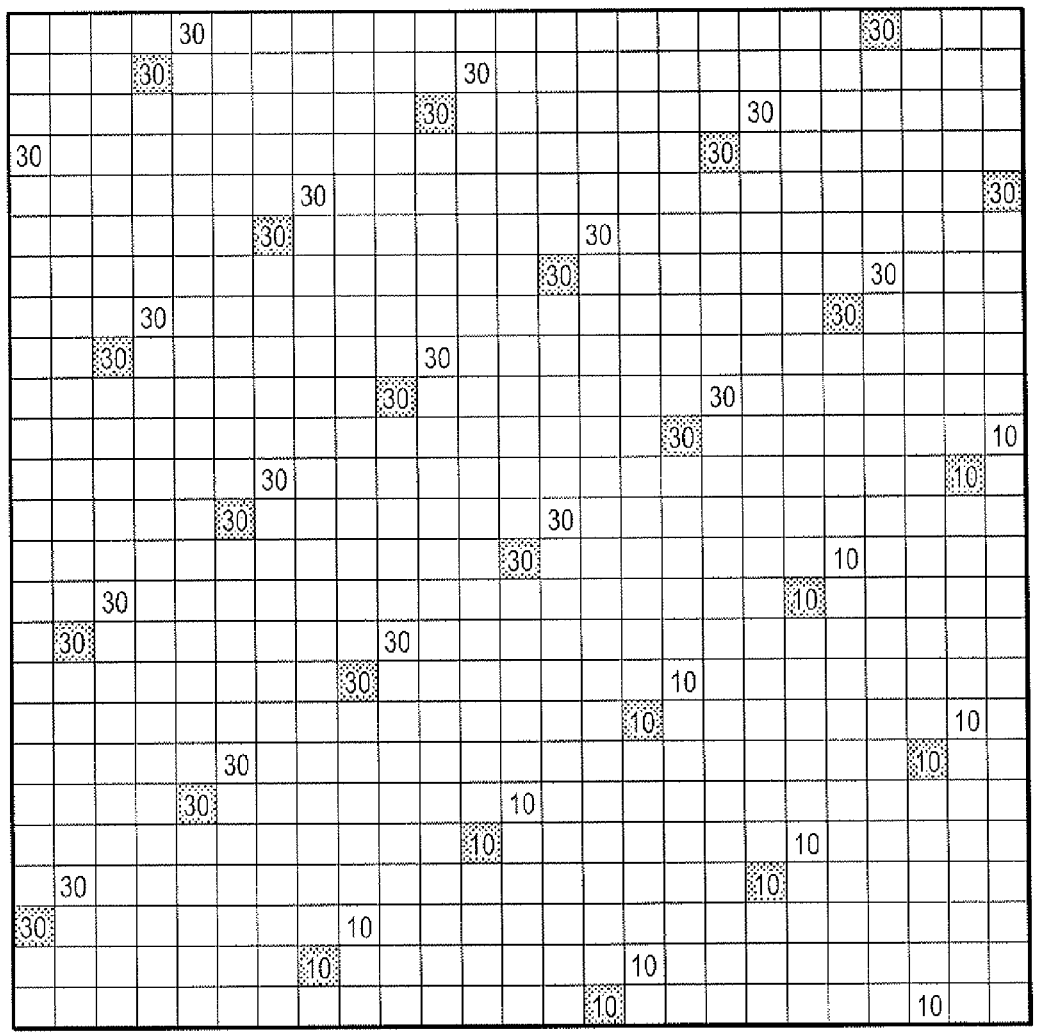
FIG. 22 is a diagram showing a processing result example in a multi-value code image assignment part for 90 degree rotation according to an embodiment of the present invention.
Figure 25:
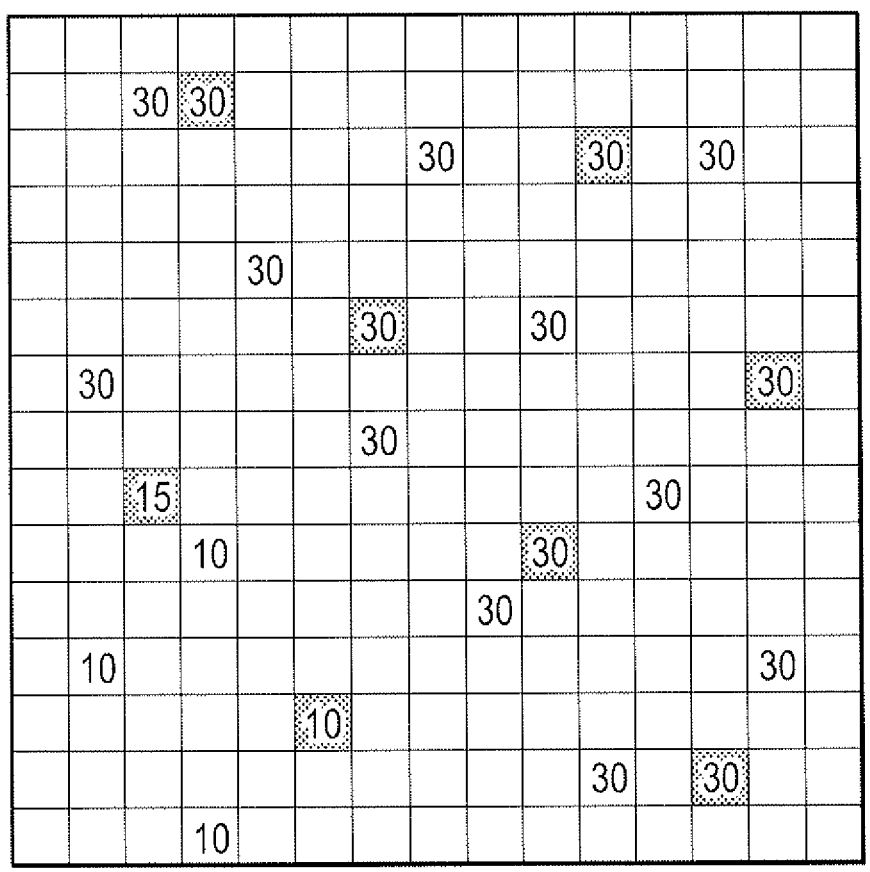
FIG. 25 is a diagram showing a processing result example in a multi-value code image assignment section for 75% reduction according to an embodiment of the present invention.

FIG. 22 and FIG. 25 show examples of the images in the processing results of the multi-value code image assignment part 1604, respectively. FIG. 22 shows the case of 90 degree rotation and FIG. 25 shows the case of 75% reduction. The multi-value code written in the white background cell shows the multi-value code after the affine transformation, and the gray background cell indicates the growth core before the affine transformation. The multi-value code written in the gray background cell is the processing result of the multi-value code image assignment part 1604 (above second dot pattern code information).

The multi-value code image obtained in this manner is converted back again into the one bit image of the dot pattern by a dot pattern development part 1605.

The dot pattern development part 1605 reads the multi-value code image obtained in S1806 from the SRAM 136 and develops the multi-value code image into a dot pattern image using the dot pattern/multi-value code corresponding information 1400. That is, the dot pattern development part 1605 table-searches the multi-value codes in the dot pattern/multi-value code corresponding information 1400 for the multi-value code image pixel value obtained by the multi-value code image assignment part 1604 (second dot pattern code information) and extracts a corresponding dot pattern. Then, the dot pattern development part 1605 locates the dot pattern in the buffer prepared in the SRAM 136 so as to develop the dot pattern around the growth core before the affine transformation within the specific area.

The dot pattern development part 1605, after having developed all the multi-value codes into the dot patterns, outputs the developed image as an output image 1620 and transfers the image to the tile integration part 503.

Figure 23:
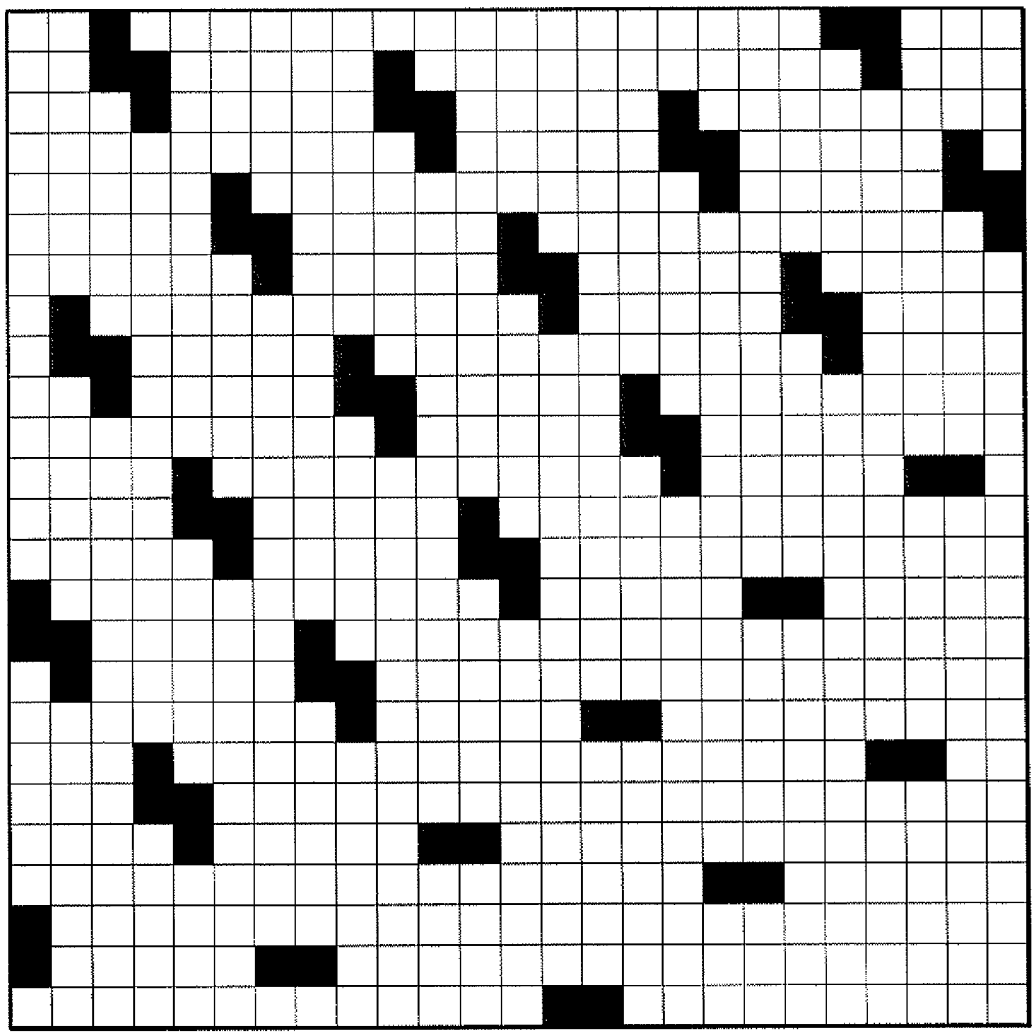
FIG. 23 is a diagram showing a processing result example in a dot pattern development part for 90 degree rotation according to an embodiment of the present invention.
Figure 26:
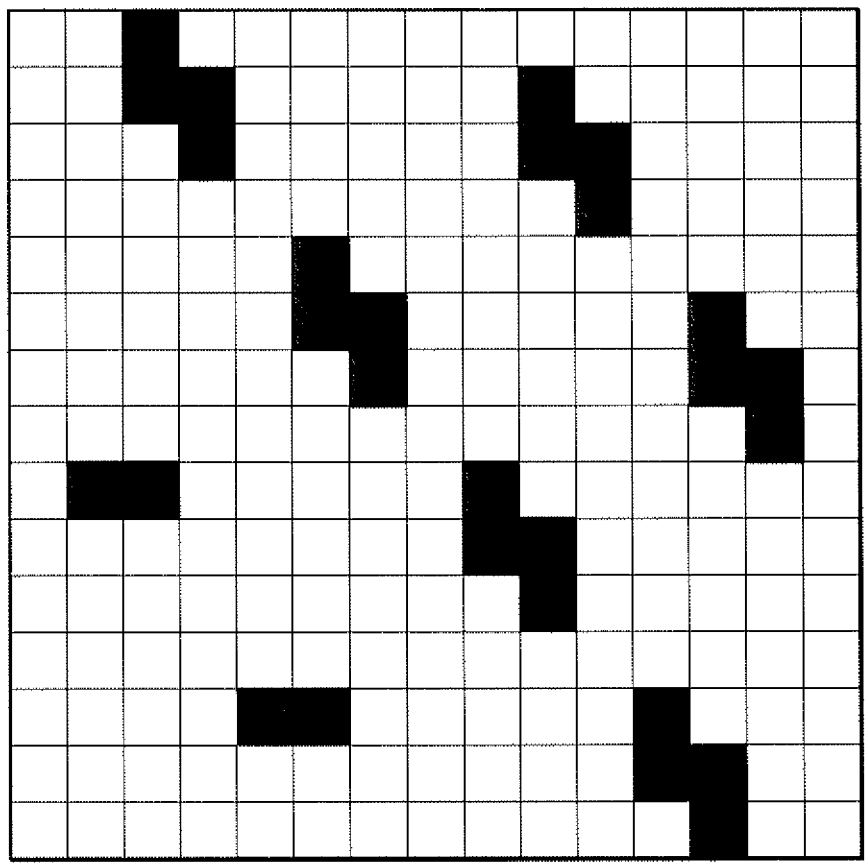
FIG. 26 is a diagram showing a processing result example in a dot pattern development part for 75% reduction according to an embodiment of the present invention.

FIG. 23 and FIG. 26 show examples of the processing results in the dot pattern development part 1605 for the case of 90 degree rotation and the case of 75% reduction, respectively.

FIG. 23 and FIG. 26 show that the input image of the dot pattern is converted into the rotated and reduced output images, respectively, by the above respective processes while retaining the growth pattern of the dither matrix.

As described above, in the present embodiment, the image processing apparatus detects the growth core which is the center of the screen growth using the dither matrix used in the screen processing and specifies the image area (specific area) where the dots grow around the detected growth core. Then, the image processing apparatus performs multi-value encoding of the dot pattern existing in the specific area using the table associating the plurality of dot patterns (preferably all the dot patterns to be realized within the specific area) with the numerical values for encoding (dot pattern/multi-value code corresponding information 1400). This multi-value-coded information (dot pattern code information) is retained as the growth core pixel value (multi-value code pixel value) and the image processing apparatus generates the multi-value code image composed of the multi-value code pixel values.

For the case of the affine transformation, the image processing apparatus performs the affine transformation on the multi-value code image. Subsequently, the image processing apparatus assigns the code information (second dot pattern code information) to the growth core coordinates before the affine transformation using the pixel value (multi-value code pixel value) at the coordinate position (growth core coordinates after the affine transformation) of the closely neighboring pixel having the multi-value-coded information. Then, the image processing apparatus develops the dot pattern at the coordinate position of the growth core before the affine transformation into the surrounding image area (within the specific area) using the second dot pattern code information and the above table.

In this manner, since the object of the affine transformation is not the actual dot pattern but the code information representing the dot pattern, the present embodiment can suppress the change of the dot size and the deformation of the dot itself caused in the actual affine transformation.

Further, the present embodiment assigns the code information (second dot pattern code information), which reflects the code information of the growth core dot pattern after the affine transformation around the growth core before the affine transformation, to the growth core coordinates before the affine transformation in the multi-value code image after the affine transformation. Accordingly, it is possible to grow the dots from the original coordinate position of the used dither matrix. That is, as described above, the number of the screen lines is determined by the positions of the growth cores. Thereby, the number of the screen lines can be made the same before and after the affine transformation by use of the growth core coordinate position before the affine transformation in the multi-value code image after the affine transformation as a start point of arranging the dot pattern when the output image is generated. Accordingly, the output image after the affine transformation can be made equivalent to the image without the affine transformation processing.

Further, in the present embodiment, a certain focused dot pattern is processed through the conversions of the dot pattern to the code information and the code information to the dot pattern, and the affine transformation is carried out for the code information. At this time, the same table (table for multi-value encoding the dot pattern; the dot pattern/multi-value code corresponding information 1400) is used for the conversion from the dot pattern into the code information and for the conversion from the code information into the dot pattern. Accordingly, the same signal value can obtain the same dot pattern, and it is possible to cause the shape and size of the dot pattern obtained by the development of the second dot pattern code information to be the same as those before the affine transformation.

Second Embodiment

In the first embodiment, the multi-value code image assignment part 1604 provided to the affine transformation part 504 in the graphic processor 135 is configured to obtain the pixel values around the growth core coordinates and carry out the interpolation calculation as in the steps S1804 and S1805 of the processing flow example in FIG. 18. The present embodiment shows an example of using the pixel value of the multi-value code image after the affine transformation at a pixel nearest to the growth core coordinates before the affine transformation.

Figure 27:
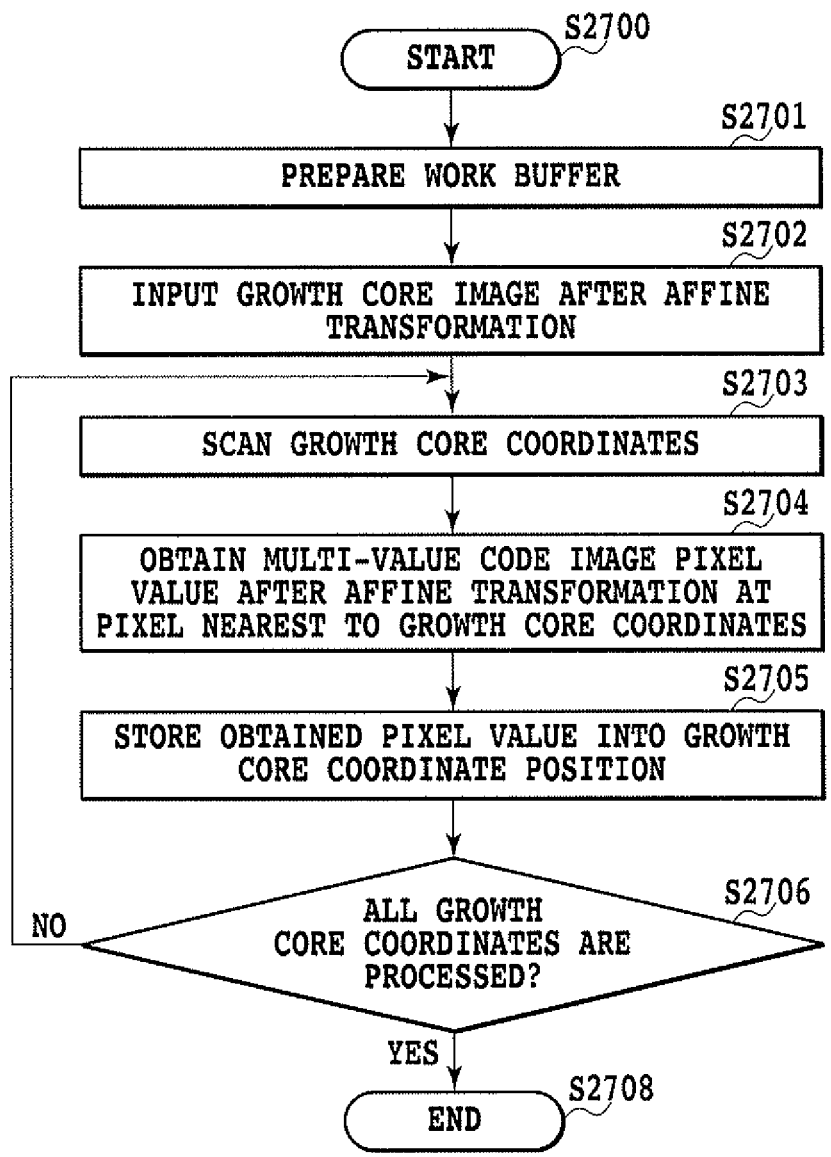
FIG. 27 is a diagram showing a processing flow example in a multi-value code assignment part according to an embodiment of the present invention.

The processing of the multi-value code image assignment part 1604 according to the present embodiment will be described by use of the flow of FIG. 27 as an example.

In S2700, the multi-value code image assignment part 1604 starts the processing.

In S2701, the multi-value code image assignment part 1604 prepares an output buffer having the same size as that of the tile image after the affine transformation in the SRAM 136.

Next, in S2702, the multi-value code image assignment part 1609 reads out the multi-value code image after the affine transformation by the multi-value code image affine transformation part 1603, from the SRAM 136.

In S2703, the multi-value code image assignment part 1604 scans the growth core coordinates before the affine transformation on the multi-value code image after the affine transformation using the growth core coordinates 1501.

In S2704, for the growth core coordinates found by the scanning, the multi-value code image assignment part 1604 searches for the nearest pixel among the pixels having the multi-value codes around the growth core coordinates as the pixel values (growth cores after the affine transformation). In S2705, the multi-value code image assignment part 1604 assigns the found pixel value to the position of the scanned growth core coordinate (corresponding to the growth core coordinate before the affine transformation) and stores the pixel value into the buffer in the SRAM 136.

In S2706, the multi-value code image assignment part 1604 checks whether or not all the growth cores have been processed, and returns the process to S2703, if all the growth cores have not been processed. If all the growth cores have been processed, the process is terminated in S2707.

By such processing flow, the interpolation calculation of the found pixel values is not carried out and thereby it is possible to obtain an effect of improving the processing performance. In the case that the affine transformation is carried out only for the rotation, the simplified processing does not cause accuracy degradation and thereby is particularly effective.

Third Embodiment

In the first and second embodiments, the affine transformation part 504 in the graphic processor 135 carries out the processing using the preliminarily generated dot pattern/multi-value code corresponding information 1400. On the other hand, the present embodiment shows a processing example without using the dot pattern/multi-value code corresponding information 1400 by storing the dot pattern and providing ID thereto in the operation of the affine transformation part 504.

Figure 28:
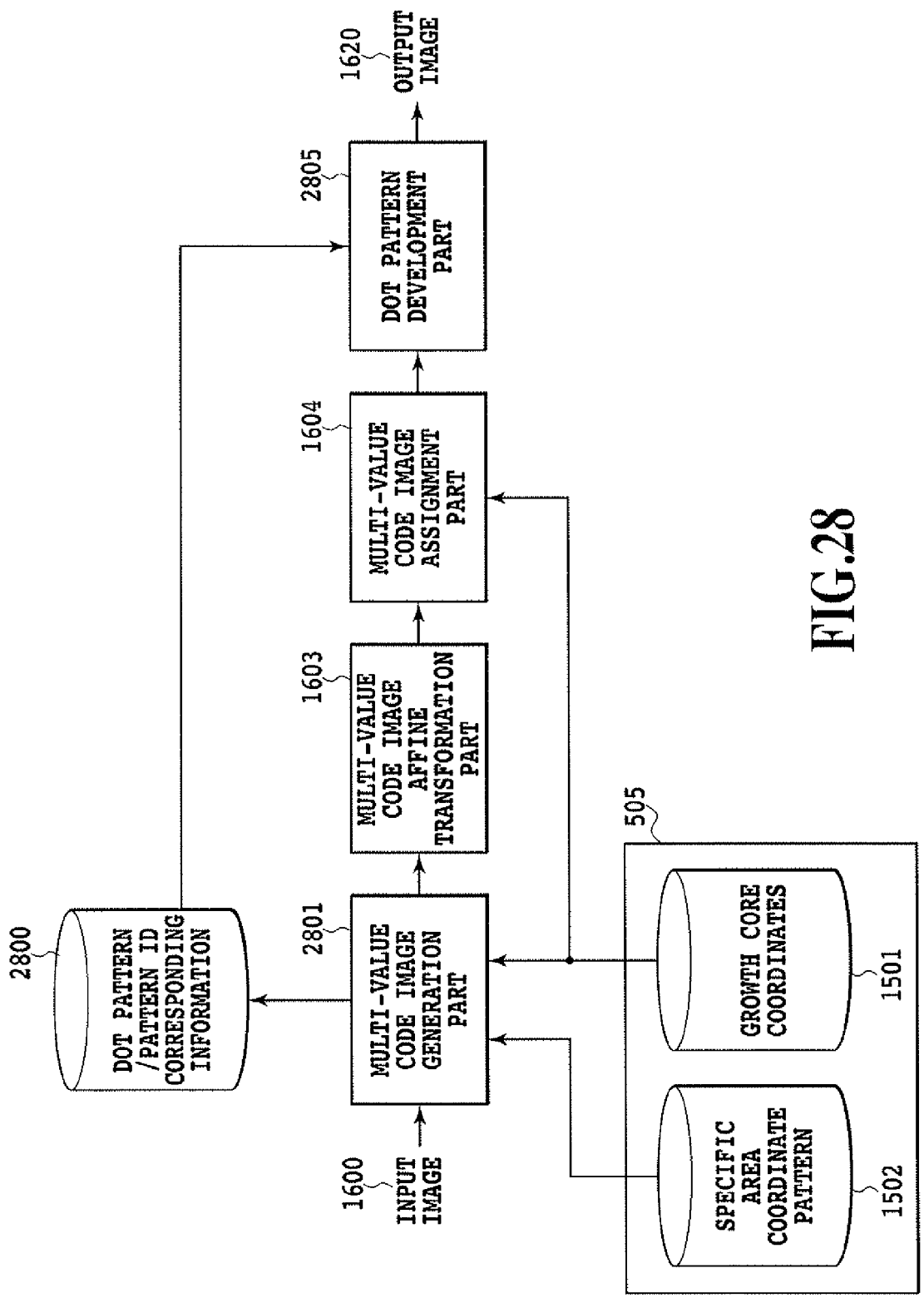
FIG. 28 is a block configuration diagram of an affine transformation part according to an embodiment of the present invention.

A configuration example of the affine transformation part in the present embodiment will be described by use of FIG. 28.

In the configuration of the present embodiment, a multi-value code image generation part 2801 stores the dot pattern within the specific area from the input image 1600 into the SRAM 136 as dot pattern/pattern ID corresponding information 2800 together with the ID information for identifying the dot pattern. That is, the ID information functions as the above multi-value code, since the corresponding dot pattern can be obtained by the above ID information. In this manner, the dot pattern/pattern ID corresponding information 2800 functions as a table retaining each dot pattern and the correspondingly provided ID information in association with each other.

A dot pattern development part 2805 develops the dot pattern from the multi-value code which is the dot pattern ID using the dot pattern/pattern ID corresponding information 2800.

Figure 29:
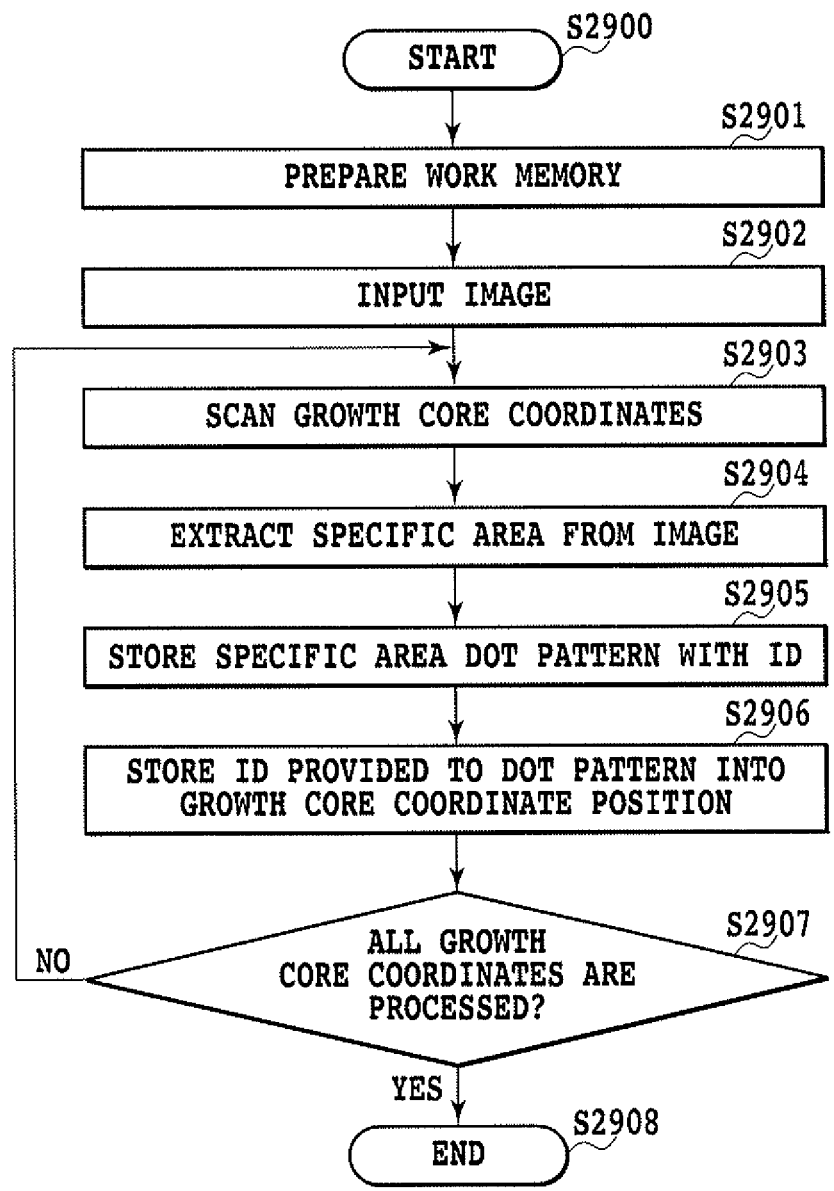
FIG. 29 is a diagram showing a processing flow example of a multi-value code image generation part according to an embodiment of the present invention.
Figure 30:
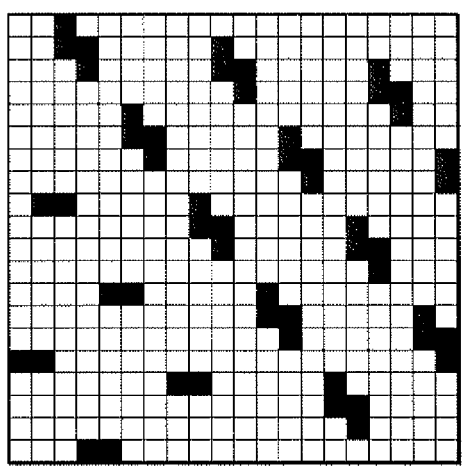
FIG. 30 is a diagram showing a conventional state of 90 degree rotation for a screen-processed image.
Figure 30:
Figure 30:
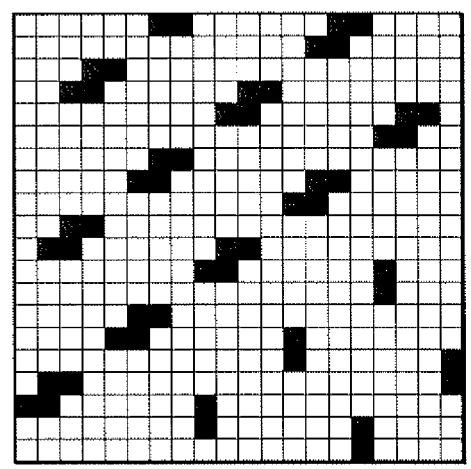
Figure 31:
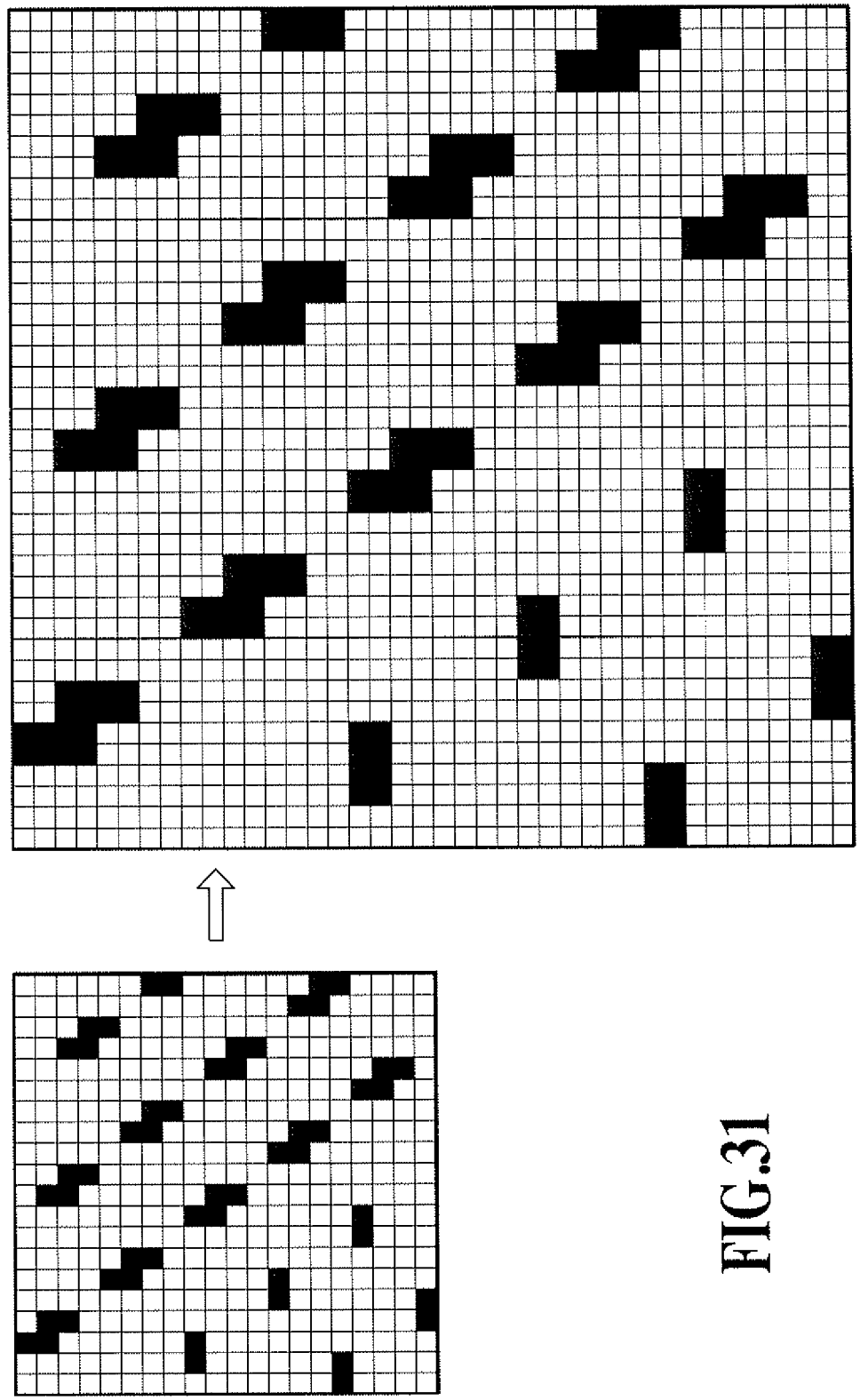
FIG. 31 is a diagram showing a conventional state of two-fold enlargement for a screen-processed image.
Figure 32:
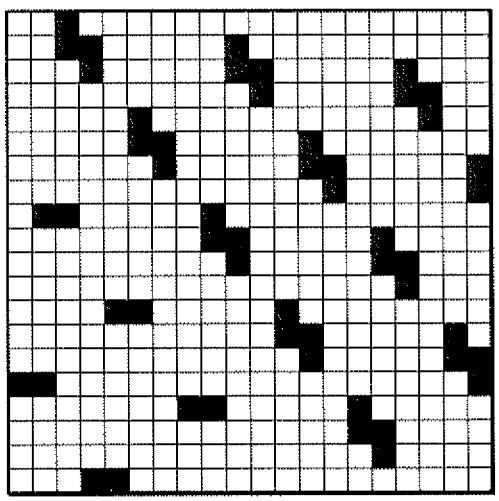
FIG. 32 is a diagram showing a conventional state of half reduction for a screen-processed image.
Figure 32:
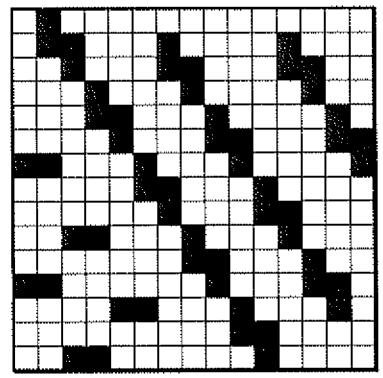

The operation of the multi-value code image generation part 2801 in the present embodiment will be described by use of the flow example shown in FIG. 29.

The multi-value code image generation part 2801 starts the processing in S2900.

In S2901, the multi-value code image generation part 2801 prepares a buffer for the output of the multi-value code image in the SRAM 136. The size of this buffer may be the same as that of the tile image.

Next, in S2902, the multi-value code image generation part 2801 receives the input image 1600 which has been divided into tiles in the tile division part 502. In S2903, the multi-value code image generation part 2801 scans the growth core coordinates in the image received in S2902 in a sequence; from the coordinate origin (upper left), left to right, down by one line, and then left to right, for example, using the growth core coordinate 1501.

In S2904, the multi-value code image generation part 2801 extracts the dot pattern within the specific area centering the growth core found by the scanning using the specific area coordinate pattern 1502. For carrying out this extraction, the multi-value code image generation part 2801 may extract a dot pattern obtained by OR of the dot pattern within the specific area centering the growth core coordinates and the specific area coordinate pattern 1502. The extracted dot pattern is stored into the SRAM 136.

In S2905, the multi-value code image generation part 2801 stores the extracted dot pattern within the specific area as the dot pattern/pattern ID corresponding information 2800 together with the pattern ID. The multi-value code image generation part 2801 provides the pattern ID uniquely to a pattern appearing first.

In S2906, the multi-value code image generation part 2801 stores the pattern ID as the multi-value code provided to the dot pattern into the output buffer secured in the SRAM 136 at a growth core coordinate position.

In S2907, the multi-value code image generation part 2801 checks whether or not all the growth cores have been subjected to the multi-value encoding processing, and, if not, returns the process to S2903 and continues the processing for the growth core which has not been processed. If all the growth cores have been processed, the multi-value code image generation part 2801 terminates the process in S2908 and transfers the process to the multi-value code image affine transformation part 1603.

Note that, in the case that the pattern ID is provided as the pixel value of the multi-value code image as described above, it is necessary not to carry out the interpolation calculation in the multi-value code image assignment part 1604.

By the processing flow as described above, it is possible to realize the operation without carrying out the pattern matching with the dot pattern within the specific area and the effect of the processing performance improvement can be obtained. Further, it is not necessary to preliminarily prepare the dot pattern/multi-value code corresponding information and the effect of memory capacity reduction can be obtained.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-278651, filed Oct. 29, 2008, which is hereby incorporated by reference herein in its entirety.

What is claimed is:

1. An image processing apparatus, comprising:
   a unit generating a multi-value code image by assigning first dot pattern code information to each of growth center pixels, which are growth centers of screen processing, in an image subjected to the screen processing by use of a dither matrix, the first dot pattern code information representing a dot pattern and obtained by encoding the dot pattern existing in an image area where dots grow around the growth center pixels;
   a unit performing an affine transformation on the multi-value code image;
   a unit assigning second dot pattern code information, which represents the dot pattern, to each of the growth center pixels before the affine transformation in the multi-value code image after the affine transformation according to the first dot pattern code information of at least one growth center pixel after the affine transformation, the at least one growth center pixel neighboring close to the growth center pixel before the affine transformation; and
   a unit developing the dot pattern for the image area at each of the growth center pixels before the affine transformation according to the second dot pattern code information.

2. The image processing apparatus according to claim 1, wherein the generation unit includes:
   a unit extracting the growth center pixel from the image subjected to the screen processing by use of the dither matrix; and
   a unit specifying the image area around the extracted growth center pixel.

3. The image processing apparatus according to claim 2, wherein
   the extraction of the growth center pixel by the extraction unit and the specification of the image area by the specification unit are carried out according to dither matrix information which represents the dither matrix.

4. The image processing apparatus according to claim 2, further comprising
   a table associating a plurality of dot patterns with numerical values for the encoding, wherein
   the generation unit carries out assignment of the first dot pattern code information by assigning the numerical value, which corresponds to the dot pattern existing in the specified image area, to the growth center pixel as a pixel value with reference to the table, and wherein
   the development unit obtains the dot pattern corresponding to the second dot pattern code information with reference to the table and develops the obtained dot pattern in the image area relative to a growth center coordinate before the affine transformation.

5. The image processing apparatus according to claim 2, wherein the generation unit further includes:
 a unit extracting the dot pattern from the image area;
 a unit providing the extracted dot pattern with ID;
 a unit assigning the ID to the growth center pixel as the first dot pattern code information; and
 a unit retaining the extracted dot pattern and the ID for identifying the dot pattern in association with each other, wherein
 the development unit obtains the dot pattern corresponding to the retained ID and develops the obtained dot pattern in the image area relative to a growth center coordinate before the affine transformation.

6. The image processing apparatus according to claim 1, wherein
 the assignment unit interpolates the first dot pattern code information of a plurality of growth center pixels after the affine transformation to obtain the second dot pattern code information, the plurality of growth center pixels neighboring close to the growth center pixel before the affine transformation.

7. The image processing apparatus according to claim 1, wherein
 the assignment unit assigns the first dot pattern code information of the growth center pixel after the affine transformation as the second dot pattern code information, the growth center pixel being located nearest to the growth center pixel before the affine transformation.

8. The image processing apparatus according to claim 1, wherein
 the affine transformation is at least one of rotation transformation, enlargement transformation, and reduction transformation.

9. An image processing method, comprising the steps of:
 generating, using a processor, a multi-value code image by assigning first dot pattern code information to each of growth center pixels, which are growth centers of screen processing, in an image subjected to the screen processing by use of a dither matrix, the first dot pattern code information representing a dot pattern and obtained by encoding the dot pattern existing in an image area where dots grow around the growth center pixels;
 performing, using a processor, an affine transformation on the multi-value code image;
 assigning, using a processor, second dot pattern code information, which represents the dot pattern, to each of the growth center pixels before the affine transformation in the multi-value code image after the affine transformation according to the first dot pattern code information of at least one growth center pixel after the affine transformation, the at least one growth center pixel neighboring close to the growth center pixel before the affine transformation; and
 developing, using a processor, the dot pattern for the image area at each of the growth center pixels before the affine transformation according to the second dot pattern code information.

10. The image processing method according to claim 9, wherein the generation step includes the steps of:
 extracting the growth center pixel from the image subjected to the screen processing by use of the dither matrix; and
 specifying the image area around the extracted growth center pixel.

11. The image processing method according to claim 10, wherein
 the extraction of the growth center pixel by the extraction step and the specification of the image area by the specification step are carried out according to dither matrix information which represents the dither matrix.

12. The image processing method according to claim 10, wherein
 the generation step carries out assignment of the first dot pattern code information by assigning a numerical value, which corresponds to the dot pattern existing in the specified image area, to the growth center pixel as a pixel value with reference to a table associating a plurality of dot patterns with the numerical values for the encoding, and wherein
 the development step obtains the dot pattern corresponding to the second dot pattern code information with reference to the table and develops the obtained dot pattern in the image area relative to a growth center coordinate before the affine transformation.

13. The image processing method according to claim 10, wherein the generation step further includes the steps of:
 extracting the dot pattern from the image area;
 providing the extracted dot pattern with ID;
 assigning the ID to the growth center pixel as the first dot pattern code information; and
 retaining the extracted dot pattern and the ID for identifying the dot pattern in association with each other, and wherein
 the development step obtains the dot pattern corresponding to the retained ID and develops the obtained dot pattern in the image area relative to a growth center coordinate before the affine transformation.

14. The image processing method according to claim 9, wherein
 the assignment step interpolates the first dot pattern code information of a plurality of growth center pixels after the affine transformation to obtain the second dot pattern code information, the plurality of growth center pixels neighboring close to the growth center pixel before the affine transformation.

15. The image processing method according to claim 9, wherein
 the assignment step assigns the first dot pattern code information of the growth center pixel after the affine transformation as the second dot pattern code information, the growth center pixel being located nearest to the growth center pixel before the affine transformation.

16. The image processing method according to claim 9, wherein
 the affine transformation is at least one of rotation transformation, enlargement transformation, and reduction transformation.

17. A non-transitory, computer-readable storage medium storing a program causing a computer to execute the steps of:
 generating a multi-value code image by assigning first dot pattern code information to each of growth center pixels, which are growth centers of screen processing, in an image subjected to the screen processing by use of a dither matrix, the first dot pattern code information representing a dot pattern and obtained by encoding the dot pattern existing in an image area where dots grow around the growth center pixels;
 performing an affine transformation on the multi-value code image;
 assigning second dot pattern code information, which represents the dot pattern, to each of the growth center pixels before the affine transformation in the multi-value code image after the affine transformation according to the first dot pattern code information of at least one growth center pixel after the affine transformation, the at least one growth center pixel neighboring close to the growth center pixel before the affine transformation; and developing the dot pattern for the image area at each of the growth center pixels before the affine transformation according to the second dot pattern code information.

* * * * *